(12) United States Patent
Peugeot et al.

(10) Patent No.: US 12,258,667 B2
(45) Date of Patent: Mar. 25, 2025

(54) OXYGEN EVOLUTION REACTION ELECTRODE CATALYST ASSEMBLY COMPRISING DENDRITIC NICKEL FOAM, ITS USE AND A METHOD TO PRODUCE SAID ASSEMBLY

(71) Applicants: TOTALENERGIES ONETECH, Courbevoie (FR); COLLÈGE DE FRANCE, Paris (FR)

(72) Inventors: Adèle Peugeot, Paris (FR); Marc Fontecave, Saint Ismier (FR); Charles Creissen, Cambridge (GB); Moritz Wilhelm Schreiber, Seneffe (BE)

(73) Assignees: TOTALENERGIES ONETECH, Courbevoie (FR); COLLÈGE DE FRANCE, Paris (FR)

( * ) Notice: Subject to any disclaimer, the term of this patent is extended or adjusted under 35 U.S.C. 154(b) by 0 days.

(21) Appl. No.: 18/701,701

(22) PCT Filed: Oct. 3, 2022

(86) PCT No.: PCT/EP2022/077449
§ 371 (c)(1),
(2) Date: Apr. 16, 2024

(87) PCT Pub. No.: WO2023/066645
PCT Pub. Date: Apr. 27, 2023

(65) Prior Publication Data
US 2024/0328005 A1    Oct. 3, 2024

(30) Foreign Application Priority Data
Oct. 18, 2021    (EP) .................................... 21315200

(51) Int. Cl.
| | | |
|---|---|---|
| C25B 11/00 | (2021.01) | |
| C25B 1/04 | (2021.01) | |
| C25B 11/031 | (2021.01) | |
| C25B 11/061 | (2021.01) | |
| C25B 11/089 | (2021.01) | |

(52) U.S. Cl.
CPC ............. *C25B 11/031* (2021.01); *C25B 1/04* (2013.01); *C25B 11/061* (2021.01); *C25B 11/089* (2021.01)

(58) Field of Classification Search
CPC ... C25B 11/031; C25B 11/089; C25B 11/061; C25B 1/04
See application file for complete search history.

(56) References Cited

PUBLICATIONS

International Preliminary Report on Patentability issued in Application No. PCT/EP2022/077449, dated Apr. 23, 2024, 6 pages.
Wu Mao-Sung et al., "Hollow mesoporous nickel dendrites grown on porous nickel foam for electrochemical oxidation of urea", Electrochimica Acta, (Feb. 27, 2019), vol. 304, pp. 131-137.
(Continued)

*Primary Examiner* — Zulmariam Mendez
(74) *Attorney, Agent, or Firm* — Ewing & Jones, PLLC

(57) ABSTRACT

The present disclosure relates to a method to produce an oxygen evolution reaction electrode catalyst assembly comprising a dendritic nickel foam. The method is remarkable in that it comprises the steps of (a) providing a dendritic nickel foam material; (b) etching the dendritic nickel foam material by placing it in a etch solution being an acidic aqueous solution or an aqueous solution of metal chloride and recovering an etched dendritic nickel foam with nickel dendrites showing a chimney-like structure.

20 Claims, 9 Drawing Sheets

(56) References Cited

PUBLICATIONS

Adèle Peugeot, et al., "Benchmarking of oxygen evolution catalysts on porous nickel supports", (May 19, 2021), pp. 1-43.

Yin Huajie et al., "Remarkably enhanced water splitting activity of nickel foam due to simple immersion in a ferric nitrate solution", Nano Research, Tsinghua University Press, CN, vol. 11, No. 8, (Aug. 2, 2018), pp. 3959-3971.

Zhang Wei et al., "NiFe-based nanostructures on nickel foam as highly efficiently electrocatalysts for oxygen and hydrogen evolution reactions", Journal of Energy Chemistry, Elsevier, Amsterdam, NL, vol. 39, (Jan. 30, 2019), pp. 39-53.

International Search Report and Written Opinion issued in Application No. PCT/EP2022/077449, dated Jan. 27, 2023, 7 pages.

Asnavandi et al., "Promoting Oxygen Evolution Reactions through Introducing Oxygen Vacancies to Benchmark NiFe—OOH Catalysts"; ACS Energy Lett., 2018, 3, 20 pages.

Chaudhari N. K., et al., "Nanostructured material on 3D nickel foam as electrocatalysts for water splitting", Nanoscale, 2017, 9, 18 pages.

Cui et al., "Monolithic nanoporous Ni—Fe alloy by dealloying laser processed Ni—Fe—Al as electrocatalyst toward oxygen evolution reaction"; Int. J. Hydrogen Energy, 2018, 43, 11 pages.

Li et al., "Fast Electrosynthesis of Fe-Containing Layered Double Hydroxides Arrays toward Highly Efficient Electrocatalytic Oxidation Reactions"; Chem. Sci., 2015, 6, 8 pages.

Liu et al., "Nanostructured FeNi3 Incorporated with Carbon Doped with Multiple Nonmetal Elements for the Oxygen Evolution Reaction"; ChemSusChem, 2018, 11, 2703-2709.

Liu et al., "Corrosion engineering towards efficient oxygen evolution electrodes with stable catalytic activity for over 6000 hours"; Nat. Commun., 2018, 9, 2609, 10 pages.

Lofti N. et al., "Surface modification of Ni foam by the dendrite Ni—Cu electrode for hydrogen evolution reaction in an alkaline solution"; J. Electroanal. Chem., 2018, 848, 113350, 10 pages.

Long et al., "Porous FeNi Oxides Nanosheets as Advanced Electrochemical Catalysts for Sustained Water Oxidation"; J. Mater. Chem. A, 2016, 4, 7 pages.

Lu et al., "Three-dimensional NiFe layered double hydroxide film for high-efficiency oxygen evolution reaction"; Chem. Commun., 2014, 50, 6479-6482.

Lu et al., "Electrochemical tuning of layered lithium transition metal oxides for improvement of oxygen evolution reaction"; Nat. Commun., 2014, 5, pp. 1-7.

Lu et al., "Electrodeposition of hierarchically structured three-dimensional nickel-iron electrodes for efficient oxygen evolution at high current densities"; Nat. Commun., 2015, 6, 6616, 7 pages.

Schalenbach M. et al., "A perspective on low-temperature water electrolysis—challenges in alkaline and acidic technology"; Int. J. Electrochem. Sci.,; 2018, 13, 1173-1226.

Song et al., "An Unconventional Iron Nickel Catalyst for the Oxygen Evolution Reaction" ACS Cent. Sci., 2019, 5, 558-568.

Wei W. et al., "A bio-inspired 3D quasi-fractal nanostructure for an improved oxygen evolution reaction" Chem. Comm., 2019, 55, 357-360.

Yang et al., "Three-dimensional porous Ni film electrodeposited on Ni foam: High performance and low-cost catalytic electrode for H2O2 electrooxidation in KOH solution" Electrochim. Acta, 2013, 107, 194-199.

Yu et al., "Fabrication of FeNi hydroxides double-shell nanotube arrays with enhanced performance for oxygen evolution reaction" Appl. Catal. B Environ., 2020, 261, 118193, 10 pages.

Zhang J-Y., et al., "Rational design of cobalt-iron selenides for highly efficient electrochemical oxidation" (ACS Appl. Mater. Interfaces, 2017, 9 (39), 22 pages.

OXYGEN EVOLUTION REACTION ELECTRODE CATALYST ASSEMBLY COMPRISING DENDRITIC NICKEL FOAM, ITS USE AND A METHOD TO PRODUCE SAID ASSEMBLY

CROSS-REFERENCE TO RELATED APPLICATIONS

This application claims the benefit of PCT/EP2022/077449 filed Oct. 3, 2022, which claims priority from EP 21315200.2 filed Oct. 18, 2021, which are incorporated herein by reference in their entireties for all purposes.

FIELD OF THE DISCLOSURE

The present disclosure relates to an electrode catalyst assembly suitable for catalyzing the oxygen evolution reaction, a method for producing such electrode catalyst assembly and the use of such an electrode catalyst assembly in the oxygen evolution reaction.

BACKGROUND OF THE DISCLOSURE

The oxygen evolution reaction (OER) is one of the most relevant anodic reactions within electrochemical cells, where it is coupled to the hydrogen evolution reaction (HER) or the $CO_2$ reduction reaction ($CO_2$RR) to energy-dense carbon compounds at the cathode. It is thus of high relevance for electrochemical energy conversion and storage technologies. Oxygen generation from water oxidation at the anode is typically carried out in acidic or alkaline conditions. Operation in alkaline conditions allows the use of cheap, efficient and stable non-precious-metal catalysts, in contrast to acidic conditions, in which only expensive and scarce noble metal-based catalysts such as $IrO_2$ and $RuO_2$ exhibit significant stability. In alkaline conditions, the best performance and highest stabilities were observed for Ni-based multimetallic catalysts, which led to their widespread use as OER catalysts, as notably indicated in the study of Schalenbach M. et al., entitled "*A perspective on low-temperature water electrolysis—challenges in alkaline and acidic technology*" (*Int. J. Electrochem. Sci.*, 2018, 13, 1173-1226).

However, sluggish kinetics of the four-electron oxygen evolution reaction require a significant anodic overpotential to achieve relevant geometric current densities, reducing the efficiency of the conversion of electrical to chemical energy.

Hence identifying efficient, cheap and stable OER catalysts comprising earth-abundant elements is of fundamental importance and has been a prominent field of research during the last 20 years. Among non-noble multi-metallic metal-based OER catalysts reported so far, mixed nickel/iron/cobalt oxides, in particular, have shown stable low overpotentials at relevant geometric current densities.

On the other hand, nickel foam (NF) is an efficient current collector and good support for active material deposition, due to its conductivity, mechanical strength, relative inertness at alkaline pH and low cost. Nickel foam shows extended geometric surface areas and fine three-dimensional structures which makes it attractive as a support for heterogeneous catalysts (see the study of Chaudhari N. K., et al., entitled "Nanostructured material on 3D nickel foam as electrocatalysts for water splitting", Nanoscale, 2017, 9, 12231-12247).

Thus, the study by Zhan J-Y., et al., entitled "*Rational design of cobalt-iron selenides for highly efficient electrochemical oxidation*" (*ACS Appl. Mater. Interfaces*, 2017, 9 (39), 33833-33840) shows that $Co_{0.4}Fe_{0.6}Se_2$ nanosheets on nickel foam exhibit an overpotential of 217 mV at a current density of 10 mA $cm^{-2}$.

The study by Wu M.-S. et al., entitled "*Hollow mesoporous nickel dendrites grown on porous nickel foam for electrochemical oxidation of urea*" (*Electrochim. Acta*, 2019, 304, 131-137) describes a microporous nickel foam with attached hollow mesoporous nickel dendrites prepared through electrochemical deposition of copper-nickel dendrites on the nickel foam followed by selective removal of the copper cores. The nickel dendrites with hollow porous structures offer transport networks in the three-dimensional conductive skeleton for the fast movement of electrolyte species and electrons. In this study, the electrocatalytic oxidation of urea occurred at the catalyst-electrolyte interface. The porous nature of the nickel foam with nickel dendrites offers a large number of interconnected pores which permits the penetration and the percolation of electrolyte species into the inner region of hollow dendrites, facilitating the redox reaction of urea. Moreover, more active sites are offered for urea adsorption.

The study by Lofti N. et al., entitled "*Surface modification of Ni foam by the dendrite Ni-Cu electrode forhydrogen evolution reaction in an alkaline solution*" (*J. Electroanal. Chem.*, 2019, 848, 113350) describes that the nickel foam modified with nickel dendrites can be used as a catalyst in a hydrogen evolution reaction. The such electrode provides an overpotential of 202 mV at a current density of 10 mA $cm^{-2}$ and a Tafel slope of 82 mV $decade^{-1}$.

The study by Wei W. et al., entitled "*A bio-inspired 3D quasi-fractal nanostructure for an improved oxygen evolution reaction*" (*Chem. Comm.*, 2019, 55, 357-360) describes a catalyst having an active phase comprising Fe and Ni which is deposited on Fe-doped nanoarrays of dendritic nickel trees. The catalyst has been used in oxygen evolution reactions and presents an overpotential of 250 mV at a current density of 50 mA $cm^{-2}$ or an overpotential of 263 mV at a current density of 100 mA $cm^{-2}$.

The study by Peugeot A. et al, entitled "*Benchmarking of oxygen evolution catalysts on porous nickel supports*" (Joule 2021, 5, 1281-1300) reported a benchmarking of nine of the most active recently reported OER catalysts deposited on nickel foam (NF). A key point of this research was the finding that nickel foam could be converted into a reasonably active and stable OER catalyst, NiNF, by electrodeposition of nickel dendrites on its surface.

The need for OER electrocatalysts exhibiting low overpotential has not yet been fulfilled, especially under conditions close to industrial application, namely at elevated current density. There is still a search to enhance the efficiency of conversion of electrical energy into chemical energy.

SUMMARY OF THE DISCLOSURE

One or more of the above needs can be fulfilled by the oxygen evolution reaction electrode catalyst assembly according to the present disclosure comprising etched dendritic nickel foam material.

According to a first aspect, the present disclosure provides a method to produce an oxygen evolution reaction (OER) electrode catalyst assembly comprising a dendritic nickel foam; the method is remarkable in that it comprises the steps of:
   (a) providing a dendritic nickel foam material (NiNF) being a nickel foam that shows a dendrite morphology evidenced by scanning electron microscopy with nickel dendrites forming a nickel dendrites layer;

(b) etching the dendritic nickel foam material (NiNF) by placing it in a etch solution having a pH ranging from 1.0 to 4.0 and being an aqueous acidic solution or an aqueous solution of metal chloride and recovering an etched dendritic nickel foam with nickel dendrites showing a chimney-like structure; and (c) of addition of one or more transition metals, wherein the step (c) comprises a step (c1) of galvanic exchange reaction or a step (c2) of electrodeposition or both steps c1) of galvanic exchange reaction and step (c2) of electrodeposition Surprisingly, it was found that it is possible to improve the activity of an evolution reaction (OER) electrode catalyst assembly by the use of a dendritic nickel foam material (NiNF) for which the activity was improved via an etching reaction and by the addition of one or more transition metals in a subsequent step; in particular, surprising results on overpotential and Tafel slope have been obtained. Without being bound by a theory, it is believed that improvement in the activity of dendritic nickel foam is obtained by the formation of a new level of porosity on the nickel dendrites layer. Indeed, small pores of shallow depths have been formed on the top of the nickel dendrites giving them a chimney-like structure as shown in FIG. 2B. The addition of metal is performed on a structured etched dendritic nickel foam material (NiNFc).

In a preferred embodiment, wherein a step (c2) of electrodeposition is performed, the method may further comprise a leaching step (d).

Thus, according to another definition, the present disclosure provides a method to produce an oxygen evolution reaction (OER) electrode catalyst assembly comprising a dendritic nickel foam; the method is remarkable in that it comprises the steps:

(a) providing a dendritic nickel foam material (NiNF) being a nickel foam that shows a dendrite morphology evidenced by scanning electron microscopy with nickel dendrites forming a nickel dendrites layer;

(b) etching the dendritic nickel foam material (NiNF) by placing it in a etch solution having a pH ranging from 1.0 to 4.0 and being an aqueous acidic solution or an aqueous solution of metal chloride and recovering an etched dendritic nickel foam with nickel dendrites showing a chimney-like structure; and (c) addition of one or more transition metals by a step (c1) of galvanic exchange reaction or (c2) of electrodeposition or by a step comprising successively in any order a sub-step (c1) of galvanic exchange reaction and a sub-step (c2) of electrodeposition.

Whatever the definition selected, one or more of the following can be used to better define the method.

For example, step (a) comprises providing nickel foam followed by a step of electrodeposition of nickel on said nickel foam to obtain a dendritic nickel foam. Such a step allows depositing a nickel layer having a dendritic morphology on the surface of the nickel foam, hereafter named the "nickel dendrite layer". This nickel dendrite layer is etched in step b) and can be further doped in step c1) and/or covered with a metallic catalyst layer in step c2).

For example, step (a) comprises providing a dendritic nickel foam selected to have a double-layer capacitance of at least 2.0 mF as determined by cyclic voltammetry in the range between +0.95 V and +1.05 V versus RHE; preferably of at least 4.0 mF.

For example, the etching step (b) is performed in a etch solution for a time ranging from 1 to 60 minutes; preferably, from 1 to 45 minutes; more preferably from 1 to 30 minutes; even more preferably from 1 to 25 minutes, most preferably from 1 to 20 minutes; even most preferably from 1 to 15 minutes; or preferably from 2 to 10 minutes, or more preferably from 3 to 8 minutes.

For example, the etch solution has a pH ranging from 1.2 to 3.5; preferably ranging from 1.5 to 3.0; more preferably from 1.8 to 2.5.

The reaction time of the etching step (b) is depending on the pH of the etch solution. For example, the etching step (b) is performed in a etch solution having a pH ranging from 1.8 to 2.5 for a time ranging from 1 to 15 minutes; preferably from 2 to 10 minutes, more preferably from 3 to 8 minutes.

For example, in step (b), the etch solution is an aqueous solution of metal chloride at a concentration ranging from 20 to 100 mM and/or is an aqueous solution comprising $FeCl_3$ or is an aqueous solution of $FeCl_3$.

In an embodiment, the method further comprises a step (c) of addition of one or more transition metals with a step (c1) of doping the etched dendritic nickel foam with one or more transition metals via a galvanic exchange reaction and recovering a Me-doped dendritic nickel foam with Me-doped nickel dendrites showing a chimney-like structure.

For example, the step (c1) using a galvanic exchange reaction, the etched dendritic nickel foam is doped with one or more transition metals selected from Fe, Cr, Co, Cu, V, Mn, Mo, Pt, W and any mixture thereof; preferably, the one or more transition metals are selected from Fe, Cu, Mo, Pt, W and any mixture thereof; more preferably, the one or more transition metal is or comprises Fe.

For example, the step (c1) using a galvanic exchange reaction, the etched dendritic nickel foam is doped with one or more transition metals selected from Fe, Cr, Co, V, Mn, Mo, Pt, W and any mixture thereof; preferably, the one or more transition metals are selected from Fe, Mo, Pt, W and any mixture thereof.

In another embodiment, the method further comprises a step (c2) of electrodeposition on the etched dendritic nickel foam of a metallic catalyst comprising one or more transition metals selected from Fe, Cr, Co, Cu, V, Mn, Mo, Ni, Pt, W and any mixture thereof; preferably, the one or more transition metals are selected from Fe, Cr, Co, V, Mn, Mo, Ni, Pt, W and any mixture thereof; more preferably the one or more transition metals are selected from Cr, V, Mo, W and any mixture thereof.

In an embodiment, the one or more transition metals comprise Co and/or Fe.

For example, the metallic catalyst is a multi-metallic catalyst and comprises Ni and Fe and at least one additional metal selected from Cr, Co, Cu, V, Mn, Mo, Pt, W and any mixture thereof; preferably, the at least one additional metal selected from Cr, Co, V, Mn, Mo, Pt, W and any mixture thereof; more preferably, selected from Cr, V, Mo, W and any mixture thereof, and even more preferably, the at least one additional metal is or comprises Cr.

For example, the metallic catalyst is a multi-metallic catalyst and step (c2) is followed by a step (d) of leaching to decrease the content of at least one transition metal of the multi-metallic catalyst.

In an embodiment, the etched dendritic nickel foam with nickel dendrites showing a chimney-like structure recovered in step (b) is porous with three levels of porosity and shows pores of a first type having an average pore size diameter ranging from 20.0 μm to 50.0 μm as determined by scanning electron microscopy, pores of a second type having an average pore size diameter ranging from 1.0 to 5.0 µm as determined by scanning electron microscopy, and pores of a third type having an average pore size diameter ranging from 0.1 µm to 1.0 µm as determined by scanning electron microscopy.

With preference, the pores of the third type have an average pore size diameter ranging from 0.1 µm to 0.6 µm as determined by scanning electron microscopy.

In an embodiment, the etched dendritic nickel foam with nickel dendrites showing a chimney-like structure recovered in step (b) is porous and shows pores of a fourth type having an average pore size diameter ranging from 100 µm to 1000 µm as determined by scanning electron microscopy; with preference ranging from 200 to 800 µm According to a second aspect, the disclosure provides an oxygen evolution reaction electrode catalyst assembly remarkable in that it is produced by the method according to the first aspect.

According to a third aspect, the disclosure provides an oxygen evolution reaction electrode catalyst assembly remarkable in that it comprises an etched dendritic nickel foam with nickel dendrites showing a chimney-like structure forming an etched nickel dendrites layer being porous with three levels of porosity and showing pores of a first type having an average pore size diameter ranging from 20.0 µm to 50.0 µm as determined by scanning electron microscopy, pores of a second type having an average pore size diameter ranging from 1.0 to 5.0 µm as determined by scanning electron microscopy, and pores of a third type having an average pore size diameter ranging from 0.1 µm to 1.0 µm as determined by scanning electron microscopy.

With preference, the pores of the third type have an average pore size diameter ranging from 0.1 µm to 0.6 µm as determined by scanning electron microscopy.

For example, the etched dendritic nickel foam is doped with one or more transition metals selected from Fe, Cr, Co, Cu, V, Mn, Mo, Pt, Wand any mixture thereof; preferably, the one or more transition metals are selected from Fe, Cu, Mo, Pt, W and any mixture thereof; more preferably the one or more transition metal is or comprises Fe.

For example, the etched dendritic nickel foam is doped with one or more transition metals selected from Fe, Cr, Co, V, Mn, Mo, Pt, W and any mixture thereof; preferably, the one or more transition metals are selected from Fe, Mo, Pt, W and any mixture thereof.

For example, one or more doping transition metals are present at a content ranging from 5 to 30 at. % as analyzed by EDX; preferably ranging from 8 to 25 at. %; more preferably ranging from 10 to 20 at. %.

For example, the etched dendritic nickel foam is doped and the pores of the third type have an average pore size diameter ranging from 0.1 µm to 0.6 µm as determined by scanning electron microscopy.

According to a fourth aspect, the disclosure provides an oxygen evolution reaction electrode catalyst assembly comprising a metallic catalyst and a support, with the metallic catalyst being deposited on the support, the electrode catalyst assembly is remarkable in that the support is an etched dendritic nickel foam and in that the metallic catalyst comprises one or more transition metals selected from Fe, Cr, Co, Cu, V, Mn, Mo, Ni, Pt, W and any mixture thereof.

Preferably, the oxygen evolution reaction electrode catalyst assembly comprises a metallic catalyst and a support, with the metallic catalyst being deposited on the support, and the electrode catalyst assembly is remarkable in that the support is an etched dendritic nickel foam with nickel dendrites showing a chimney-like structure forming an etched nickel dendrites layer being porous with three levels of porosity and show pores of a first type having an average pore size diameter ranging from 20.0 µm to 50.0 µm as determined by scanning electron microscopy, pores of a second type having an average pore size diameter ranging from 1.0 to 5.0 µm as determined by scanning electron microscopy, and pores of a third type having an average pore size diameter ranging from 0.1 µm to 1.0 µm as determined by scanning electron microscopy; and in that the metallic catalyst comprises one or more transition metals selected from Fe, Cr, Co, Cu, V, Mn, Mo, Ni, Pt, W and any mixture thereof.

With preference, the one or more transition metals comprise Co and/or Fe.

For example, the metallic catalyst is a multi-metallic catalyst and is or comprises Fe and Ni, and/or in that the metallic catalyst is a multi-metallic catalyst and is or comprises Fe, Ni and one or more transition metals selected from Cr, Co, Cu, V, Mn, Mo, Pt, W and any mixture thereof.

For example, the metallic catalyst is or comprises Fe, Ni and Cr; with preference, the metallic catalyst comprises, as analyzed by EDX, from 55 to 80 at. % of Fe;
from 15 to 30 at. % of Ni; and
from 5 to 15 at. % of Cr.

The oxygen evolution reaction electrode catalyst assembly according to the second, the third or the fourth aspect can be remarkable in that the etched dendritic nickel foam is porous and show pores of a fourth type having an average pore size diameter ranging from 100 µm to 1000 µm as determined by scanning electron microscopy; with preference ranging from 200 to 800 µm.

The oxygen evolution reaction electrode catalyst assembly according to the second, the third or the fourth aspect can be remarkable in that one or more of the following is true:
the oxygen evolution reaction electrode catalyst assembly has a double layer capacitance of at least 7.0 mF as determined by cyclic voltammetry in the range between +0.95 V and +1.05 V versus RHE; and/or
the oxygen evolution reaction electrode catalyst assembly shows overpotential values below 310 mV at a current density of 100 mA cm$^{-2}$ at pH 14 and in 1.0 M electrolyte solution;
and/or
the oxygen evolution reaction electrode catalyst assembly shows a Tafel slope of at most 30 mV decade$^{-1}$ as determined by chronopotentiometry measurements conducted in an aqueous 1 M solution of KOH.

According to a fifth aspect, the disclosure provides the use of an oxygen evolution reaction electrode catalyst assembly in a process for generating molecular oxygen by an oxygen evolution reaction.

According to a sixth aspect, the disclosure provides a process for generating molecular oxygen by an oxygen evolution reaction, the process comprising a step of providing water and a step of water oxidation in presence of an oxygen evolution reaction electrode catalyst assembly; the process is remarkable in that the oxygen evolution reaction electrode catalyst assembly is according to the second, the third or the fourth aspect; and/or in that the process comprises a step of preparing an oxygen evolution reaction electrode catalyst assembly by the method according to the first aspect.

According to a seventh aspect, the disclosure provides oxygen evolution reaction electrode catalyst assembly according to the third or the fourth aspect remarkable in that it is produced by the method according to the first aspect.

DETAILED DESCRIPTION

Figure 1:
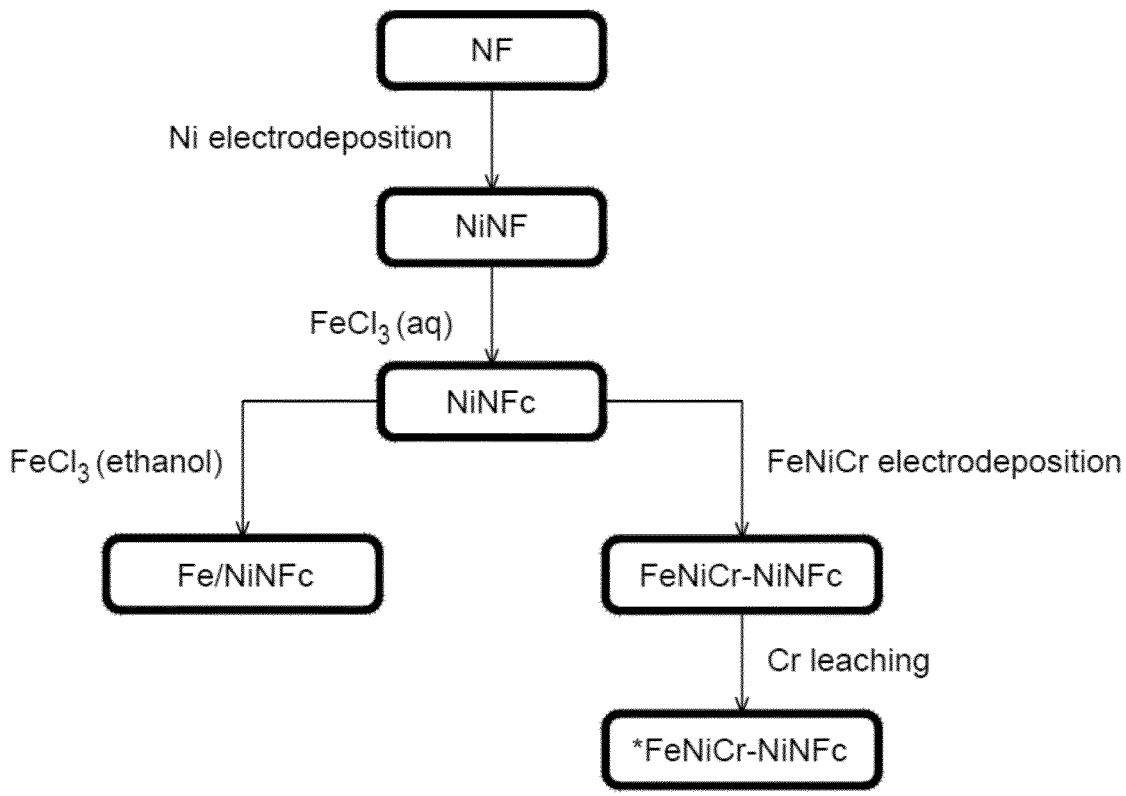
FIG. 1 is a flow chart representing the dual strategy used for OER catalyst development.

For the disclosure, the following definitions are given:

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4, 5 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The particular features, structures, characteristics or embodiments may be combined in any suitable manner, as would be apparent to a person skilled in the art from this disclosure, in one or more embodiments.

The present disclosure provides straightforward procedures for the synthesis of highly active OER catalysts starting from dendrite-modified Ni foam (NiNF). An initial method to enhance the porosity of NiNF through local etching formed an active Ni-based catalyst, NiNFc having a chimney-like structure. The activity of NiNFc was further improved through the introduction of different dopants pursuing two routes: i) Fe doping through a galvanic exchange (Fe/NiNFc), and ii) Cr doping through electrodeposition and controlled leaching (*FeNiCr—NiNFc). Both procedures were simple and effective, forming two of the best-performing OER catalysts reported to date, with strikingly low Tafel slopes of 25 mA cm$^{-2}$ and 29 mA cm$^{-2}$ for Fe/NiNFc and *FeNiCr—NiNFc, respectively. The accessibility, stability, and outstanding performance make these catalysts good candidates for integration in large-scale electrolysers.

In the present description, the method to produce an oxygen evolution reaction electrode catalyst assembly and the oxygen evolution reaction electrode catalyst assembly are described jointly.

The disclosure provides a method to produce an oxygen evolution reaction (OER) electrode catalyst assembly comprising a dendritic nickel foam; the method is remarkable in that it comprises the steps:
  (a) providing a dendritic nickel foam material (NiNF) being a nickel foam that shows a dendrite morphology evidenced by scanning electron microscopy with nickel dendrites forming a nickel dendrites layer; and
  (b) etching the dendritic nickel foam material (NiNF) by placing it in a etch solution having a pH ranging from 1.0 to 4.0 and being an aqueous acidic solution or an aqueous solution of metal chloride and recovering an etched dendritic nickel foam with nickel dendrites showing a chimney-like structure.

According to another definition, the present disclosure provides a method to produce an oxygen evolution reaction (OER) electrode catalyst assembly comprising a dendritic nickel foam; the method is remarkable in that it comprises the steps:
  (a) providing a dendritic nickel foam material (NiNF) being a nickel foam that shows a dendrite morphology evidenced by scanning electron microscopy with nickel dendrites forming a nickel dendrites layer;
  (b) etching the dendritic nickel foam material (NiNF) by placing it in a etch solution with a pH ranging from 1.0 to 4.0 and being an aqueous acidic solution or an aqueous solution of metal chloride and recovering an etched dendritic nickel foam with nickel dendrites showing a chimney-like structure;
  (c) addition of one or more transition metals by a step (c1) of galvanic exchange reaction or (c2) of electrodeposition; and,
  provided that a (c2) of electrodeposition is performed, an optional leaching step (d).

Figure 18:
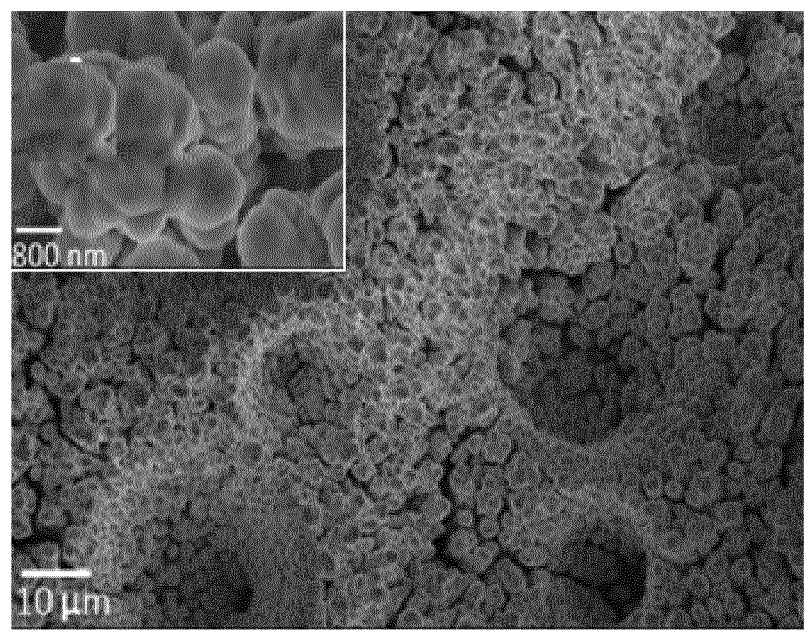
FIG. 18 is an SEM image of the dendritic Ni foam (NiNF) material provided in step (a).

The dendritic nickel foam (NiNF) material provided in step (a) is shown in FIG. 18 and can be produced by electrodeposition of nickel on a nickel foam material. An example of suitable nickel foam material is commercially available from Goodfellow.

For example, the nickel foam material is selected to have a thickness ranging from 0.5 to 6.5 mm, preferably from 0.7 to 3.5 mm; more preferably from 1.0 to 2.0 mm. For example, the nickel foam material is selected to have a purity above 95%, preferably above 98%. For example, the nickel foam is selected to have a bulk density ranging from 0.30 to 0.80 g cm$^{-3}$; preferably, from 0.35 to 0.65 g cm$^{-3}$; more preferably from 0.40 to 0.55 g cm$^{-3}$. For example, the nickel foam is selected to have at least 4 pores/cm; preferably at least 8 pores/cm; more preferably at least 14 pores/cm; even more preferably at least 18 pores/cm and most preferably at least 20 pores/cm.

Therefore, in an embodiment, step (a) comprises providing nickel foam followed by a step of electrodeposition of nickel on said nickel foam to obtain a dendritic nickel foam. The step of electrodeposition can be performed in any way and, for example, it can be performed according to the procedure described by Yang et al in "*Three-dimensional porous Ni film electrodeposited on Ni foam: High performance and low-cost catalytic electrode for $H_2O_2$ electrooxidation in KOH solution*" (*Electrochim. Acta,* 2013, 107, 194-199) that is incorporated by reference. Generation of a porous Ni-based material (NiNF) showing high OER activity is also reported in Peugeot A. et al, entitled "*Benchmarking of oxygen evolution catalysts on porous nickel supports*" (*Joule,* 2021, 5, 1281-1300) which is incorporated by reference.

With preference, the nickel foam is pretreated before performing the electrodeposition step and/or the electrodeposition step is performed using an aqueous solution of $NiCl_2$.

Without being bound by a theory, performing a pretreatment may help the formation of Ni seeds at the surface of NF, which then improves the electrodeposition step. The pretreatment can comprise soaking the nickel foam in a solution of nickel (II) chloride at a concentration ranging from 0.5 to 5.0 M; preferably, ranging from 1.0 to 4.5 M; more preferably ranging from 1.5 to 4.0 M. The pretreatment can last for a time ranging from 1 to 30 min; for example, from 5 to 20 minutes.

The electrodeposition is performed with an aqueous solution of $NiCl_2$ and $NH_4Cl$. For example, the concentration of $NiCl_2$ in the aqueous solution is ranging from 0.1 to 1.0 M and the concentration of $NH_4Cl$ is ranging from 1 to 5 M. A constant current ranging from −1.0 to −3.0 A cm$^{-2}$; preferably of −2.0 A cm$^{-2}$ can be applied. The electrodeposition time ranges from 30 seconds to 5 minutes; for example, from 1 to 3 minutes.

For example, the dendritic nickel foam produced by electrodeposition comprises a plurality of nickel dendrites. At this stage, the nickel dendrites are pure nickel and are, at this stage, free of dopants such as free of Fe.

For example, the electrodeposition step is conducted to obtain a dendritic nickel foam having a double-layer capacitance of at least 2.0 mF as determined by cyclic voltammetry in the range between +0.95 V and +1.05 V versus RHE and/or an electrochemically active surface area of at least 70 cm$^2$ cm$_{geo}^{-2}$ as determined using the following relationship $ECSA = C_{DL}/C_S$; wherein $C_{DL}$ is the double-layer capacitance in mF as determined by cyclic voltammetry in the range between +0.95 V and +1.05 V versus RHE and $C_S = 60$ μF cm$^{-2}$.

Thus, in an embodiment, step (a) comprises providing a dendritic nickel foam selected to have a double-layer capacitance of at least 2.0 mF as determined by cyclic voltammetry in the range between +0.95 V and +1.05 V versus RHE and/or an electrochemically active surface area of at least 70 $cm^2\ cm_{geo}^{-2}$ as determined using the following relationship $ECSA=C_{DL}/C_S$; wherein $C_{DL}$ is the double-layer capacitance in mF as determined by cyclic voltammetry in the range between +0.95 V and +1.05 V versus RHE and $C_S=60$ $\mu F\ cm^{-2}$.

In an embodiment, the dendritic nickel foam has a double-layer capacitance of at least 2.0 mF as determined by cyclic voltammetry in the range between +0.95 V and +1.05 V versus RHE; for example, at least 2.5 mF; for example, at least 3.0 mF; for example, at least 3.5 mF; for example, at least 4.0 mF; for example, at least 4.5 mF. For example, the dendritic nickel foam has a double-layer capacitance of at most 8.0 mF as determined by cyclic voltammetry in the range between +0.95 V and +1.05 V versus RHE; for example, at most 7.0 mF; or at most 6.0 mF; or at most 5.5 mF; or at most 5.0 mF.

Thus, in an embodiment, said dendritic nickel foam has an electrochemically active surface area of at least 70 $cm^2\ cm_{geo}^{-2}$, preferably at least 75 $cm^2\ cm_{geo}^{-2}$, more preferably at least 80 $cm^2\ cm_{geo}^{-2}$. The electrochemically active surface area (ECSA) was determined from the double-layer capacitance using $C_S=60\ \mu F\ cm^{-2}$ for the specific capacitance of a nickel-based material and the using following relationship $ECSA=C_{DL}/C_S$.

In an embodiment the dendritic nickel foam has nickel dendrites of an average diameter ranging from 2.0 to 5.0 μm; with preference, from 2.2 to 4.8 μm.

For example, the etch solution has a pH ranging from 1.2 to 3.5; preferably ranging from 1.5 to 3.0; more preferably from 1.8 to 2.5.

For example, the aqueous acidic solution comprises one or more acids selected from hydrogen chloride (HCl), nitric acid ($HNO_3$), sulfuric acid ($H_2SO_4$) and any mixture thereof; with preference, the aqueous acidic solution is or comprises hydrogen chloride (HCl).

For example, in step (b), the etch solution having a pH ranging from 1.0 to 4.0 is an aqueous solution of metal chloride at a concentration ranging from 20 to 100 mM and/or is an aqueous solution comprising $FeCl_3$ or of $FeCl_3$.

For example, the aqueous solution of metal chloride in step (b) is an aqueous solution of $FeCl_3$. For example, the metal chloride concentration used in the etching step (b) is ranging from 20 to 100 mM; preferably from 30 to 85 mM; more preferably, from 40 to 75 mM.

The time during which the etching step (b) is performed is depending on the pH of the etch solution.

For example, the etching step (b) is performed in a etch solution for a time ranging from 1 to 60 minutes; preferably, from 1 to 45 minutes; more preferably from 1 to 30 minutes; even more preferably from 1 to 25 minutes, most preferably from 1 to 20 minutes; even most preferably from 1 to 15 minutes; or preferably from 2 to 10 minutes, or more preferably from 3 to 8 minutes.

For example, the etching step (b) is performed at a pH ranging from 1.8 to 2.5 for a time ranging from 1 to 15 minutes; preferably from 2 to 10 minutes, more preferably from 3 to 8 minutes.

The person skilled in the art will adapt the etching reaction time of other ranges of pH without difficulties. For example, the use of etch solutions with a pH higher than 2.5 may be required as well as a longer time for the etching reaction to achieve the optimum improvement in activity. However, as it is shown in the examples, prolonged treatment of the nickel dendrites was found to be detrimental to the activity. Thus, in case of a reduction of the activity upon etching reaction by comparison to the initial activity of the dendritic nickel foam material (i.e., as determined before the etching step) the person skilled in the art may consider reducing the etching reaction time.

The resulting etched dendritic nickel foam with nickel dendrites showing a chimney-like structure forming an etched nickel dendrites layer being porous with three levels of porosity and show pores of a first type having an average pore size diameter ranging from 20.0 μm to 50.0 μm as determined by scanning electron microscopy, pores of a second type having an average pore size diameter ranging from 1.0 to 5.0 μm as determined by scanning electron microscopy, and pores of a third type having an average pore size diameter ranging from 0.1 μm to 1.0 μm as determined by scanning electron microscopy.

For example, the pores of the first type have an average pore size diameter ranging from 20.0 μm to 50.0 μm as determined by scanning electron microscopy; for example, ranging from 25.0 to 45.0 μm; for example, ranging from 28.0 to 42.0 μm; for example, ranging 30.0 μm to 40.0 μm. The pores of the first type have a spherical shape as shown in the SEM image in FIG. 18.

For example, the pores of the second type have an average pore size diameter ranging from 1.0 μm to 5.0 μm as determined by scanning electron microscopy; for example, ranging from 1.2 to 4.5 μm; for example, ranging from 1.5 to 4.2 μm; for example, ranging 1.8 μm to 4.0 μm. The pores of the second type can be found between nickel dendrites.

For example, the pores of a third type have an average pore size diameter ranging from 0.1 μm to 1.0 μm as determined by scanning electron microscopy or ranging from 0.1 μm to 0.6 μm, and in the absence of dopant show an average pore size diameter ranging from 0.5 μm to 1.0 μm. The pores of the third type are hollowed out in the dendrites, have a shallow depth and give to the dendritic nickel foam with nickel dendrites showing a chimney-like structure.

Since the etched dendritic nickel foam is made from a nickel foam that was already a porous material, the etched dendritic nickel foam may also show pores of a fourth type having an average pore size diameter ranging from 100 μm to 1000 μm as determined by scanning electron microscopy; for example, ranging from 200 to 900 μm; for example, ranging from 300 to 800 μm; for example, ranging from 350 to 700 μm; for example, ranging 400 μm to 600 μm.

In an embodiment, the oxygen evolution reaction electrode catalyst assembly comprising an etched dendritic nickel foam has a double layer capacitance of at least 6.5 mF as determined by cyclic voltammetry in the range between +0.95 V and +1.05 V versus RHE; preferably at least 6.8; more preferably at least 7.0; even more preferably at least 7.2, and most preferably at least 7.5.

In an embodiment the oxygen evolution reaction electrode catalyst assembly comprising an etched dendritic nickel foam shows overpotential values below 340 mV at a current density of 100 $mA\ cm^{-2}$ at pH 14 and in 1.0 M electrolyte solution; preferably below 325 mV; more preferably below 310 mV, even more preferably below 300 mV; and most preferably below 295 mV.

In an embodiment the oxygen evolution reaction electrode catalyst assembly comprising an etched dendritic nickel foam shows a Tafel slope of at most 48 mV $decade^{-1}$ as determined by chronopotentiometry measurements conducted in an aqueous 1 M solution of KOH; preferably at most 45 mV $decade^{-1}$; more preferably at most 40 mV $decade^{-1}$; even more preferably at most 38 mV $decade^{-1}$;

most preferably at most 35 mV decade$^{-1}$; and even most preferably at most 32 mV decade$^{-1}$ or at most 30 mV decade$^{-1}$.

The Step (c1) of Doping the Etched Dendritic Nickel Foam with Nickel Dendrites Showing a Chimney-Like Structure In an embodiment, the method to produce an OER electrode catalyst assembly further comprises a step (c1) of doping the etched dendritic nickel foam with one or more transition metals via a galvanic exchange reaction and recovering a Me-doped dendritic nickel foam.

In that case, the present disclosure relates therefore to a method to produce an oxygen evolution reaction (OER) electrode catalyst assembly comprising a dendritic nickel foam; the method is remarkable in that it comprises the steps of (a) providing a dendritic nickel foam material (NiNF) being a nickel foam that shows a dendrite morphology evidenced by scanning electron microscopy with nickel dendrites forming a nickel dendrites layer;

(b) etching the dendritic nickel foam material (NiNF) by placing it in a etch solution having a pH ranging from 1.0 to 4.0 and being an aqueous acidic solution or an aqueous solution of metal chloride and recovering an etched dendritic nickel foam with nickel dendrites showing a chimney-like structure; and (c) addition of one or more transition metals wherein step (c) comprises a step (c1) of doping the etched dendritic nickel foam with one or more transition metals via a galvanic exchange reaction and recovering a Me-doped dendritic nickel foam with Me-doped nickel dendrites showing a chimney-like structure.

For example, the step (c1) uses a galvanic exchange reaction, the etched dendritic nickel foam is doped with one or more transition metals wherein the one or more transition metals are selected from Fe, Cr, Co, Cu, V, Mn, Mo, Pt, W and any mixture thereof; preferably, the one or more transition metals are selected from Fe, Cu, Mo, Pt, W and any mixture thereof.

In an embodiment, the step (c1) using a galvanic exchange reaction, the etched dendritic nickel foam is doped with one or more transition metals selected from Fe, Cr, Co, V, Mn, Mo, Pt, W and any mixture thereof; preferably, the one or more transition metals are selected from Fe, Mo, Pt, W and any mixture thereof.

In a preferred embodiment, the one or more transition metals is or comprises Fe.

In a preferred embodiment, the one or more transition metals is or comprises Mo.

For example, step (c1) is performed by submerging the etched dendritic nickel foam material in an organic solution of metal chloride. For example, the organic solution of metal chloride in step (c1) is a solution of FeCl$_3$ with an organic solvent. For example, the organic solvent is selected from acid acetic, acetone, benzene, butanol, butanone, t-butyl alcohol, cyclohexane, methylcyclohexane, dichloromethane, diethyl ether, 1,2-dimethoxyethane, 1,4-dioxane, ethanol, ethyl acetate, heptane, hexane, methanol, methyl t-butyl ether, pentane, propanol, tetrahydrofuran, toluene and any mixture thereof. For example, the organic solvent is or comprises ethanol.

For example, the metal chloride concentration used in the doping step (c1) is ranging from 20 to 100 mM; preferably from 30 to 85 mM; more preferably from 40 to 75 mM. For example, the doping step (c1) is performed for a time ranging from 1 to 5 hours; preferably from 2 to 4 hours, more preferably from 2.5 to 3.5 hours.

The resulting doped dendritic nickel foam shows Me-doped nickel dendrites with a chimney-like structure forming a doped etched nickel dendrites layer being porous with three levels of porosity and shows pores of a first type having an average pore size diameter ranging from 20.0 μm to 50.0 μm as determined by scanning electron microscopy, pores of a second type having an average pore size diameter ranging from 1.0 to 5.0 μm as determined by scanning electron microscopy, and pores of a third type having an average pore size diameter ranging from 0.1 μm to 1.0 μm or from 0.1 μm to 0.6 μm as determined by scanning electron microscopy.

For example, the pores of the first type have an average pore size diameter ranging from 20.0 μm to 50.0 μm as determined by scanning electron microscopy; for example, ranging from 25.0 to 45.0 μm; for example, ranging from 28.0 to 42.0 μm; for example, ranging 30.0 μm to 40.0 μm. The pores of the first type have a spherical shape as shown in the SEM image in FIG. 18.

For example, the pores of the second type have an average pore size diameter ranging from 1.0 μm to 5.0 μm as determined by scanning electron microscopy; for example, ranging from 1.2 to 4.5 μm; for example, ranging from 1.5 to 4.2 μm; for example, ranging 1.8 μm to 4.0 μm. The pores of the second type can be found between nickel dendrites.

For example, the pores of the third type having an average pore size diameter ranging from 0.1 to 0.8 μm, or from 0.1 μm to 0.6 μm, as determined by scanning electron microscopy; preferably from 0.1 to 0.5 μm, more preferably from 0.1 to 0.4 μm.

Since the doped dendritic nickel foam is made from a nickel foam that was already a porous material, the doped dendritic nickel foam may also show pores of a fourth type having an average pore size diameter ranging from 100 μm to 1000 μm as determined by scanning electron microscopy; for example, ranging from 200 to 900 μm; for example, ranging from 300 to 800 μm; for example, ranging from 350 to 700 μm; for example, ranging 400 μm to 600 μm.

For example, the doping step (c1) is performed in conditions to obtain that the one or more doping transition metals are present at a content ranging from 5 to 30 at. % as analysed by EDX; preferably, ranging from 8 to 25 at. %; more preferably ranging from 10 to 20 at. %.

In an embodiment the oxygen evolution reaction electrode catalyst assembly comprising a doped dendritic nickel foam has a double layer capacitance of at least 7.5 mF as determined by cyclic voltammetry in the range between +0.95 V and +1.05 V versus RHE; preferably at least 7.8; more preferably at least 8.0; even more preferably at least 8.2, and most preferably at least 8.5.

In an embodiment the oxygen evolution reaction electrode catalyst assembly comprising an etched dendritic nickel foam shows overpotential values below 300 mV at a current density of 100 mA cm$^{-2}$ at pH 14 and in 1.0 M electrolyte solution; preferably below 290 mV; more preferably below 280 mV, even more preferably below 275 mV; and most preferably below 270 mV.

In an embodiment the oxygen evolution reaction electrode catalyst assembly comprising a doped dendritic nickel foam shows a Tafel slope of at most 38 mV decade$^{-1}$ as determined by chronopotentiometry measurements conducted in an aqueous 1 M solution of KOH; preferably at most 35 mV decade$^{-1}$; more preferably at most 30 mV decade$^{-1}$; even more preferably at most 28 mV decade$^{-1}$; and most preferably equal to or at most 25 mV decade$^{-1}$.

The Step (c2) of Electrodeposition of a Catalyst on the Etched Dendritic Nickel Foam In an embodiment, the method to produce an OER electrode catalyst assembly further comprises a step (c2) of electrodeposition on the etched dendritic nickel foam of a metallic catalyst comprising one or more transition metals selected from Fe, Cr, Co, Cu, V, Mn, Mo, Ni, W and any mixture thereof; preferably, the one or more transition metals are selected from Fe, Cr, Co, V, Mn, Mo, Ni, Pt, W and any mixture thereof; more preferably the one or more transition metals are selected from Cr, V, Mo, W and any mixture thereof.

Thus, the oxygen evolution reaction electrode catalyst assembly is comprising a metallic catalyst and a support, with the metallic catalyst being deposited on the support, and the electrode catalyst assembly is remarkable in that the support is an etched dendritic nickel foam with nickel dendrites showing a chimney-like structure forming an etched nickel dendrites layer being porous with three levels of porosity and show pores of a first type having an average pore size diameter ranging from 20.0 µm to 50.0 µm as determined by scanning electron microscopy, pores of a second type having an average pore size diameter ranging from 1.0 to 5.0 µm as determined by scanning electron microscopy, and pores of a third type having an average pore size diameter ranging from 0.1 µm to 1.0 µm as determined by scanning electron microscopy; and in that the metallic catalyst comprises one or more transition metals selected from Fe, Cr, Co, Cu, V, Mn, Mo, Ni, Pt, W and any mixture thereof.

In that case, the present disclosure relates therefore to a method to produce an oxygen evolution reaction (OER) electrode catalyst assembly comprising a dendritic nickel foam; the method is remarkable in that it comprises the steps of
(a) providing a dendritic nickel foam material (NiNF) being a nickel foam that shows a dendrite morphology evidenced by scanning electron microscopy with nickel dendrites forming a nickel dendrites layer;
(b) etching the dendritic nickel foam material (NiNF) by placing it in a etch solution having a pH ranging from 1.0 to 4.0 and being an aqueous acidic solution or an aqueous solution of metal chloride and recovering an etched dendritic nickel foam with nickel dendrites showing a chimney-like structure;
(c2) electrodeposition on the etched dendritic nickel foam of a metallic catalyst comprising one or more transition metals selected from Fe, Cr, Co, Cu, V, Mn, Mo, Ni, Pt, W and any mixture thereof; and
(d) optional leaching.

In a preferred embodiment, the one or more transition metals comprise Co and/or Fe. For example, the metallic catalyst is a multi-metallic catalyst and is or comprises Fe and Ni. For example, the metallic catalyst is a multi-metallic catalyst and is or comprises Fe, Ni and one or more transition metals selected from Cr, Co, Cu, V, Mn, Mo, Pt, W and any mixture thereof.

For example, the metallic catalyst is a multi-metallic catalyst and is or comprises Fe, Ni and Cr.

For example, the multi-metallic catalyst comprises Ni and Fe and at least one additional metal selected from Cr, Co, Cu, V, Mn, Mo, W and any mixture thereof; with preference the at least one additional metal is or comprises Cr.

Electrodeposition is performed with ion solutions that are well-known by the person skilled in the art. For $Cr^{3+}$ and $W^{3+}$, the person skilled in the art would have the advantage to use a glycine complex to avoid polymerisation of the metals.

For example, as shown in the examples, the electrodeposition can be performed in a solution containing a $Cr^{3+}$/glycine complex (0.4M), $Ni^{2+}$ (0.04M), $Fe^{2+}$ (0.03M), and salts such as $NH_4Cl$ (0.5M), $H_3BO_3$ (0.15M) and NaCl (0.5M). A current of $-1.2$ A/cm$^2$ was applied for 30 min. In the electrodeposition step (c2), the deposition time is preferably at least 10 minutes; more preferably at least 20 minutes; even more preferably at least 25 minutes; and most preferably at least or equal to 30 minutes.

In an embodiment the metallic catalyst comprises Fe, Ni and Cr and step (c2) is conducted to have a multi-metallic catalyst comprising at least 25 at. % of Cr as analyzed by EDX; preferably at least 30 at. %; more preferably at least 35 at. %.

For example, the metallic catalyst is or comprises Fe, Ni and Cr and the metallic catalyst comprises, as analyzed by EDX,
from 20 to 80 at. % of Fe;
from 10 to 30 at. % of Ni; and
from 10 to 50 at. % of Cr.

In an embodiment, the metallic catalyst is a multi-metallic catalyst and step (c2) is followed by a step (d) of leaching to decrease the content of at least one transition metal of the multi-metallic catalyst.

The leaching step can be performed in a KOH solution of a concentration ranging from 1 to 5 M. A constant current ranging from 50 to 150 mA/cm$^2$ is applied to the electrode for at least 2.5 hours; preferably for a time ranging from 2.5 to 10 hours, more preferably for a time ranging from 3 to 10 hours.

For example, the metallic catalyst is or comprises Fe, Ni and Cr and after the leaching step the metallic catalyst comprises, as analyzed by EDX,
from 55 to 80 at. % of Fe;
from 15 to 30 at. % of Ni; and
from 5 to 15 at. % of Cr.

The method of the disclosure allows obtaining an oxygen evolution reaction electrode catalyst assembly comprising a multi-metallic catalyst and a support, with the metallic catalyst being deposited on the support, the electrode catalyst assembly is remarkable in that the support is an etched dendritic nickel foam and in that the metallic catalyst comprises one or more transition metals selected from Fe, Cr, Co, Cu, V, Mn, Mo, Ni, Pt, W and any mixture thereof; preferably, the one or more transition metals are selected from Fe, Cr, Co, V, Mn, Mo, Ni, Pt, W and any mixture thereof; more preferably the one or more transition metals are selected from Cr, V, Mo, W and any mixture thereof; even more preferably, the one or more transitions metals comprise Co and/or Fe.

The metallic catalyst deposited by electrodeposition shows a dendritic morphology. The metallic catalyst layer that is formed on the etched dendritic nickel foam is porous.

In an embodiment the oxygen evolution reaction electrode catalyst assembly comprising an etched dendritic nickel foam as support and a metallic catalyst has a double layer capacitance of at least 9.5 mF as determined by cyclic voltammetry in the range between +0.95 V and +1.05 V versus RHE; preferably at least 10.0; more preferably at least 11.0; even more preferably at least 11.5, and most preferably at least 12.0.

In an embodiment the oxygen evolution reaction electrode catalyst assembly comprising an etched dendritic nickel foam as support and a metallic catalyst shows overpotential values below 300 mV at a current density of 100 mA cm$^{-2}$ at pH 14 and in 1.0 M electrolyte solution; preferably below 290 mV; more preferably below 280 mV, even more preferably below 275 mV; and most preferably below 270 mV.

In an embodiment the oxygen evolution reaction electrode catalyst assembly comprising an etched dendritic nickel foam as support and a metallic catalyst shows a Tafel slope of at most 45 mV decade$^{-1}$ as determined by chronopotentiometry measurements conducted in an aqueous 1 M solution of KOH; preferably at most 40 mV decade$^{-1}$; more preferably at most 35 mV decade$^{-1}$; even more preferably at most 30 mV decade$^{-1}$; and most preferably equal to or at most 29 mV decade$^{-1}$.

Test and Determination Methods

Determination of the Electrochemically Active Surface Area

Cyclic voltammetry scans with different scan rates were conducted between +0.95 and +1.05 V vs. RHE and the difference between the forward and reverse scan current plotted against the scan rate to obtain double-layer capacitance, which was then related to the specific capacitance of the metal (Ni) using the following relationship: ECSA=$C_{DL}$/$C_S$.

Scanning Electron Microscopy (SEM)

SEM images were collected on a SU-70 Hitachi FEGSEM. SEM measurements have been used for examining the surface morphologies.

Chronopotentiometry Measurements

Chronopotentiometry measurements are used to determine the OER activity and Tafel slope of the catalyst assembly. Chrono-potentiometric steps (CP steps) were performed at different fixed current densities (j=0, 5, 10, 25, 50 and 100 mA cm$^{-2}$) for 5 minutes each with stirring. An 100% iR-correction was applied to avoid the contribution from the resistance of the testing system.

Inductively Coupled Plasma-Mass Spectroscopy (ICP-MS)

ICP-MS measurements were performed on an ICP-QMS 7900 Agilent apparatus. ICP-MS measurements allow evaluating the metal content.

Scanning Electron Microscopy (SEM) Combined with Energy Dispersive X-Ray (EDX) Spectroscopy SEM images were collected on a SU-70 Hitachi FEGSEM equipped with an X-Max 50 mm$^2$ Oxford spectrometer for EDX measurements. The combination of SEM-EDX allows for the determination of the elemental composition of the catalysts and catalyst assembly. EDX measurements allow determinating of the composition of the top surface layer with a thickness of about 1 µm.

Electrochemical Characterisation

A two-compartment cell separated by a glass frit was used for electrochemical measurements. The electrolyte was an aqueous solution of 1 M KOH with ultrapure KOH. A three-electrode arrangement using a platinum mesh counter electrode (Goodfellow, 2.25 cm$^2$) and an Ag/AgCl/KCl$_{sat}$ reference electrode (BioLogic), which was very regularly calibrated against potassium ferrocyanide in order to ensure the absence of any shift in its potential. The potentials were reported vs RHE according to the following Nernst equation (Equation 1):

$$E_{RHE} = E_{Ag/AgCl} + 0.197 + 0.059 \cdot pH$$

The working electrode was positioned in the cell in order to minimise the distance to the reference electrode (~ 1 mm), thus avoiding a large contribution from the cell in the ohmic drop (the resistance was always between 0.1 and 0.25Ω). Before each set of experiments, O$_2$ was flowed through the working electrode's compartment for 20-30 minutes. This is an important step as it prevents any contribution from the O$_2$ partial pressure $p_{O2}$ in the thermodynamic potential calculation (Equation 2):

$$E_{Nernst} = E_{H_2O/O_2} - 0.059 \cdot \log pH + 0.015 \cdot \log p_{O_2}$$

In an O$_2$-saturated solution $p_{O2}$=1, and the thermodynamic potential is given by the following equation (Equation 3):

$$E_{Nernst} = E_{H_2O/O_2} - 0.059 \cdot \log pH$$

Each material was characterised in 10 mL of 1 M KOH aqueous solution following a precise protocol In order to study the oxygen evolution reaction kinetics, it is important to avoid any transient oxidation process such as the oxidation of Ni(OH)$_2$ to NiOOH. For this purpose, chronopotentiometric steps (CP steps) were performed at different fixed current densities: j=0, 3, 5, 10, 25, 50, 100 and 200 mA cm$^{-2}$ for 2 minutes each with stirring (a 100% iR-correction was manually applied). In some cases, a stable potential was not obtained after 2 minutes, so the CP steps were extended by 5 additional minutes. The (j, E$_j$) data points were collected. The overpotential at a given current density j ($\eta_j$) was calculated according to the following equation (Equation 4):

$$\eta_j = E_j - 1.23$$

with E$_j$ the potential measured at the current density j, in V vs RHE. The (U,$\eta_j$) points were plotted in a j–$\eta$ graph. Tafel slopes were obtained by plotting $\eta$ against log j. The linear fit of these plots (Equation 5):

$$\eta = a + b \cdot \log j$$

This equation 5 gives the Tafel slope b.

The double-layer capacitance $C_{DL}$ values were electrochemically determined in an aqueous solution of 1 M KOH. All measurements were conducted in the voltage range +0.95-+1.05 V vs RHE as it is a non-Faradaic region for most of the studied samples as well as for the NF support. The difference between the anodic and cathodic charging currents Δj was obtained from CV scans at different scan rates (from 20 to 600 mV s$^{-1}$). The double-layer capacitance is given by (Equation 6):

$$\frac{\Delta j}{2} = v \cdot C_{DL}$$

wherein v is the scan rate. Electrochemically active surface areas (ECSAs) could theoretically be obtained using the relation (Equation 7):

$$ECSA = \frac{C_{DL}}{C_S}$$

wherein $C_S$ is the specific capacitance of the sample, which corresponds to the capacitance of an atomically smooth planar surface of the same material per unit area under identical electrolyte conditions. However, as it is impossible to determine reliable values of $C_S$ for each sample, one should be aware that this only gives an estimation of the ECSAs since the $C_S$ values vary significantly from one material to another.

Stability measurements were performed in a 2-electrode electrochemical flow cell FLC-Standard purchased from Sphere Energy. The two compartments were separated by a Nafion membrane. A platinum mesh-based cathode was used. The anolyte and catholyte were 1 M KOH aqueous solutions, 100 mL each. These solutions were recirculated in each compartment from separate containers at a flow rate of 9 mL min$^{-1}$. A current density of 100 mA cm$^{-2}$ was applied for 7 h. The potential response was measured using a leak-free Ag/AgCl/KCl$_{3.4M}$ micro reference (Innovative Instrument Ltd.). An aliquot of anolyte was collected every hour. The aliquots collected were analysed via inductively coupled plasma-mass spectrometry (ICP-MS).

EXAMPLES

The embodiments of the present disclosure will be better understood by looking at the examples below.

Materials

All chemicals were used in reagent grade. H$_2$SO$_4$, KOH and ultrapure KOH were purchased from Sigma Aldrich. NH$_4$Cl, NaCl, glycine, H$_3$BO$_3$, NiSO$_4$·6H$_2$O, NiCl$_2$·6H$_2$O, FeCl$_3$·6H$_2$O, FeCl$_2$·4H$_2$O, CrCl$_3$·6H$_2$O were purchased from Alfa Aesar. Nickel foam (1.6 mm in thickness, purity 99.5%, density 0.45 g cm$^{-3}$, 95% porosity, 20 pores cm$^{-2}$) was purchased from Goodfellow.

Bipolar membrane (Fumasep FBM-PK, 200 to 250 micrometers thick) was bought from Fuel Cell Store. Oxygen 5.0 and Argon 5.0 were purchased from Linde. Hydrothermal syntheses were performed in a Carbolite Gero CWF1213 furnace.

A Biologic VMP3 potentiostat was used for electrochemical characterisations. An Iso-ech IPS 303DD DC power supply was used for electrodeposition.

Example 1—Preparation of Dendritic Nickel Foam (NiNF) by Electrodeposition of Ni on Nickel Foam (NF)

Nickel foam (NF) was used as the support. 1 cm$^2$ square foams were cut, and an additional section was left for electrical contact. This area was partially covered with epoxy glue in order to delimit the 1 cm$^2$ area as precisely as possible. These foams were pre-treated by soaking in a 3 M HCl solution for 10 minutes, in order to remove the nickel oxide layer formed at the surface when in contact with air. Then the substrates were sonicated for 5 minutes in ethanol, 5 minutes in water and dried with compressed air before use.

The dendritic Ni foam support was synthesised as follows. First, a pre-treated Ni foam was soaked in a 0.1 M NiCl$_2$·6H$_2$O aqueous solution for 4 hours. An aqueous solution of NiCl$_2$·6H$_2$O (0.1 M) and NH$_4$Cl (2 M) was prepared and used for electrodeposition. The electrodeposition was performed in a three-necked round-bottomed flask (50 mL solution) using a three-electrode arrangement with a Pt mesh counter electrode and an Ag/AgCl/KCl$_{sat}$ reference electrode. A constant current of −2.0 A cm$^{-2}$ was applied for 100 s at the working electrode. The gas produced during deposition was delivered into a gas trap. After deposition, the sample was rinsed thoroughly with water and dried in air.

Example 2—Preparation of the Chimney-Like Dendritic Nickel Foam Via a Galvanic Exchange Reaction Samples of chimney-like dendritic nickel foam were prepared according to the following procedure:

Samples of NiNF, prepared according to the procedure of Example 1, were provided and submerged in an aqueous solution of FeCl$_3$ (FeCl$_3$·6H$_2$O) at a concentration of 50 mM for increasing periods of time (0, 1, 5, 10, 60 and 180 min). The samples were thoroughly rinsed with water and dried in the air. The OER catalytic activities of the resulting materials were evaluated in a 1 M KOH electrolyte solution and their structural characteristics and chemical compositions were analysed.

Figure 3:
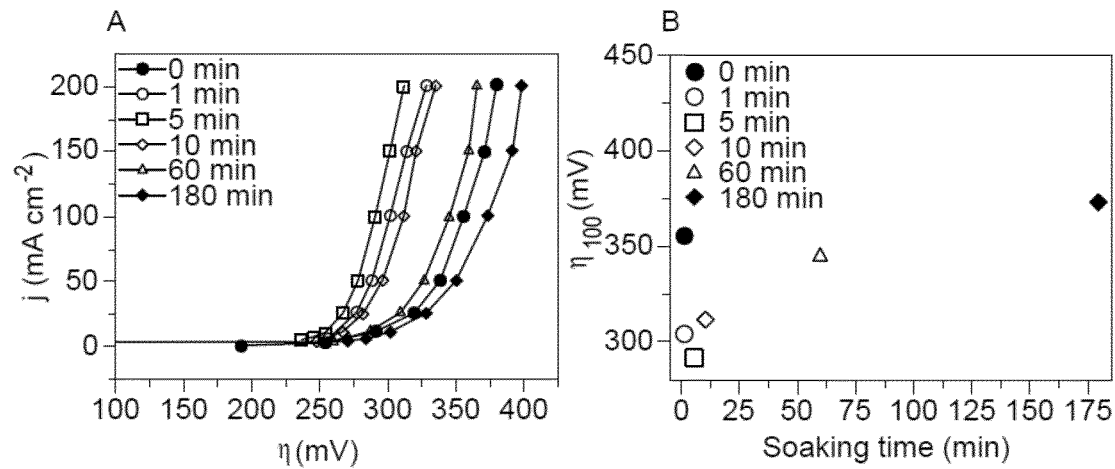
FIG. 3 shows the OER activity of NiNF submerged in Fe-containing solution. A. j–η profiles were obtained for NiNFc samples made by submersion NiNF in an aqueous solution of $FeCl_3$ for different submersion times. Data recorded from chronopotentiometric steps were recorded in a 1 M KOH electrolyte, at room temperature, under stirring, with iR-correction. B. Overpotentials measured at j=100 mA $cm^{-2}$ in 1 M KOH for different dipping times in $FeCl_3$.

The highest activity, as determined from j–η curves and overpotential values, was obtained with the sample submerged for 5 minutes in the FeCl$_3$ solution, hereafter termed NiNFc (FIG. 3). For this sample, the etching of the surface of NiNF led to a mass loss of about 1.75 mg.

Figure 4:
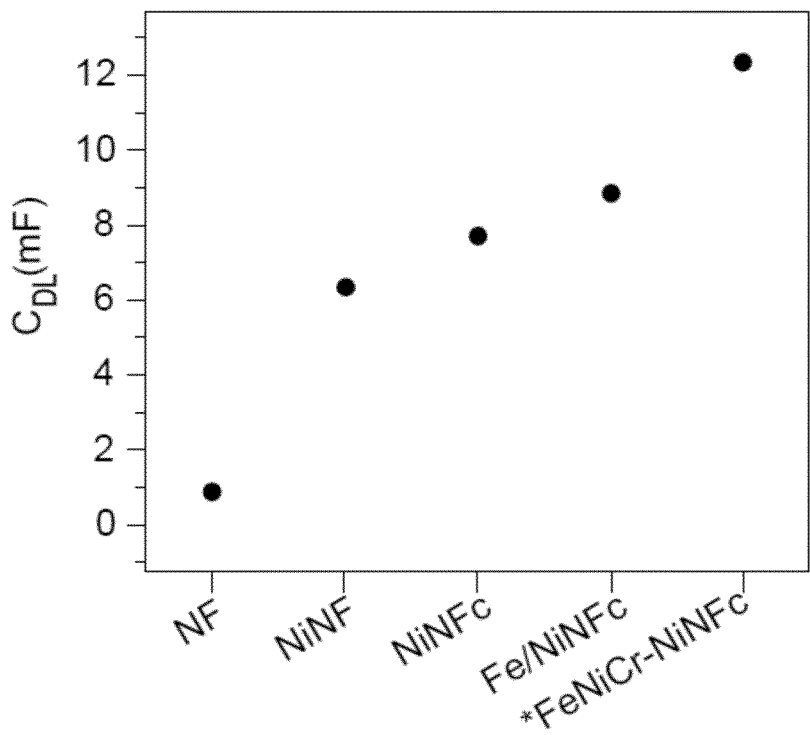
FIG. 4 shows the double-layer capacitances of FeNi-based OER catalysts reported in this study. $C_{DL}$ values were measured in 1 M KOH. Data were obtained from plots of capacitive currents against the scan rate. The measurements were performed in the range +0.95 V-+1.05 V vs RHE, which is a non-Faradaic region for these catalysts.

NiNFc material showed a much lower overpotential of $\eta_{100}$=293 mV at j=100 mA cm$^{-2}$ (FIG. 3B and Table 1) and a much lower Tafel slope value of 32 mV dec$^{-1}$ (FIG. 3C and Table 1), as compared to NiNF. The ECSA of NiNFc, estimated using the double layer capacitance value (7.7 mF) was slightly larger than that of NiNF (6.4 mF), reflecting a higher density of accessible electrochemically active sites (FIG. 4).

Below table 1 reports the activity indicators of the different catalysts. Data were recorded in 1 M KOH with iR-correction. Overpotentials $\eta_x$ were measured at j=x mA cm$^{-2}$ and Tafel slopes were obtained from chronopotentiometric steps. $C_{DL}$ data were obtained from plots of capacitive currents against the scan rate.

TABLE 1

| activity indicators of the different catalysts | | | | | |
|---|---|---|---|---|---|
| Sample | $\eta_{10}$ (mV) | $\eta_{100}$ (mV) | $\eta_{200}$ (mV) | Tafel slope (mV dec$^{-1}$) | $C_{DL}$ (mF) |
| NF | 365 | 698 | 807 | 165 | 0.9 |
| NiNF | 299 | 350 | 375 | 51 | 6.4 |
| NiNFc | 262 | 293 | 307 | 32 | 7.7 |
| Fe/NiNFc | 244 | 269 | 276 | 25 | 8.9 |
| *FeNiCr—NiNFc | 241 | 269 | 279 | 29 | 12.4 |

Figure 2:
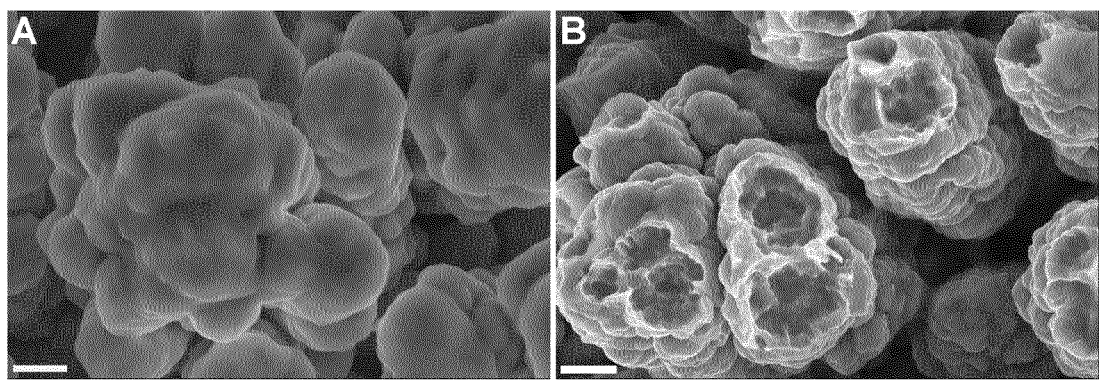
FIG. 2 shows SEM pictures of the Ni-based materials. A. NiNF. B. NiNFc. Scale bar: 600 nm.
Figure 5:
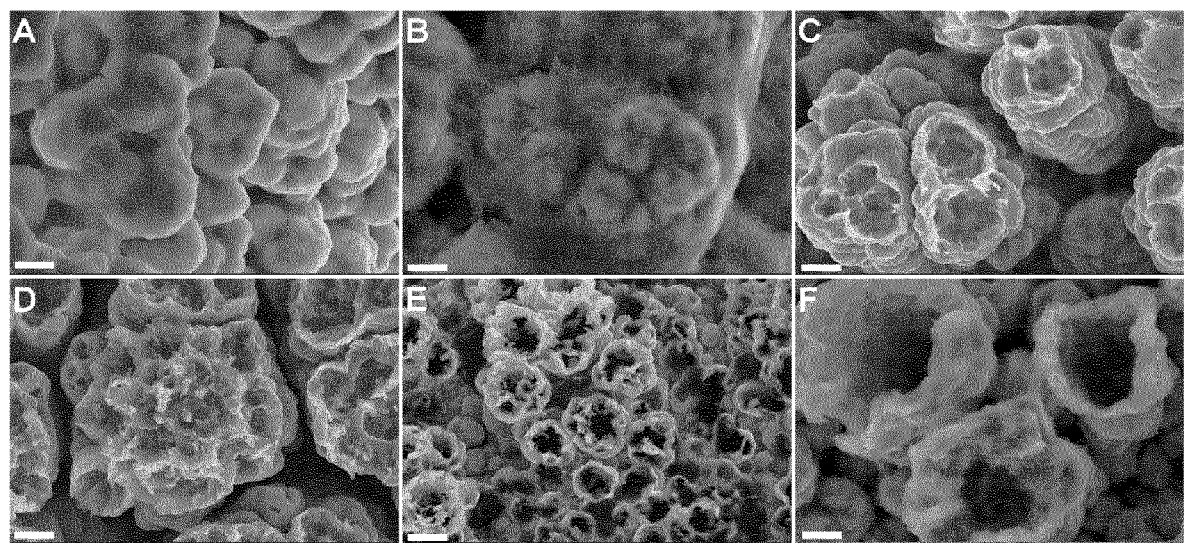
FIG. 5 shows SEM pictures of the NiNF samples submerged in a Fe-containing aqueous solution for different submersion times. A. 0 min, B. 1 min, C. 5 min, D. 10 min, E. 60 min, F. 180 min. Scale bar: 600 nm.

Scanning electron microscopy (SEM) images of treated NiNF samples, shown in FIG. 5, revealed a distinct structural change: the Ni dendrites were found to be excavated from the inside, generating nickel dendrites with chimney-like structures that became deeper and larger after longer submersion in the FeCl$_3$ solution. The most active material, NiNFc (FIG. 2B, 5C), showed increased porosity owing to this phenomenon, as compared to NiNF (FIG. 2A, 5A). This new material has 4 different levels of porosity: the large pores of NF ($\approx$500 μm), the spherically-shaped pores ($\approx$20-50 μm), the pores formed by the Ni dendrites of NiNF ($\approx$1-10 μm) and the pores formed during treatment with the FeCl$_3$ aqueous solution ($\approx$0.5-1 μm). Modifications of the morphology obtained upon prolonged treatment of the dendrites were detrimental to the activity.

The atomic composition of the treated samples was analysed by energy dispersive X-Ray spectroscopy (EDX).

Figure 6:
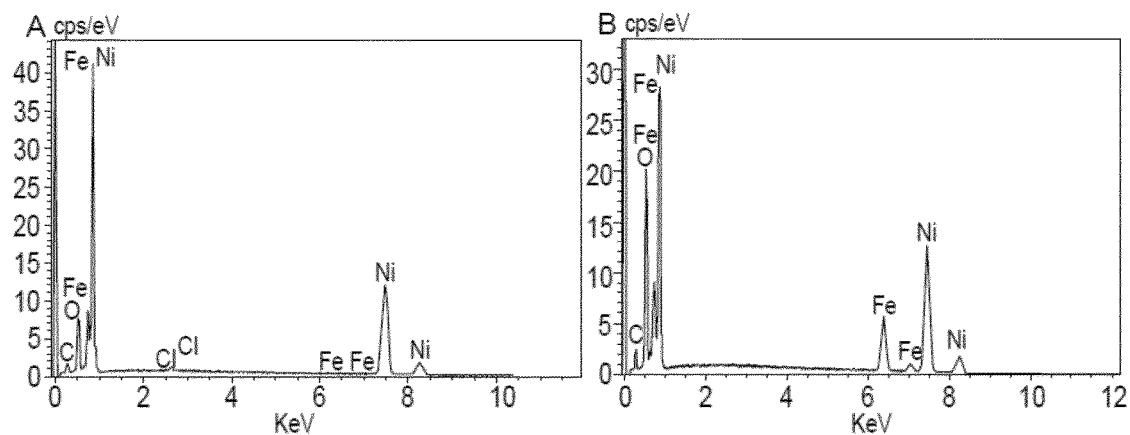
FIG. 6 shows the atomic composition of the catalysts synthesised by submersion in $FeCl_3$ solution. A. NiNFc. B. Fe/NiNFc. Data were obtained using X-ray electron diffraction spectroscopy (EDX). Excitation voltage: 15 kV.
Figure 7:
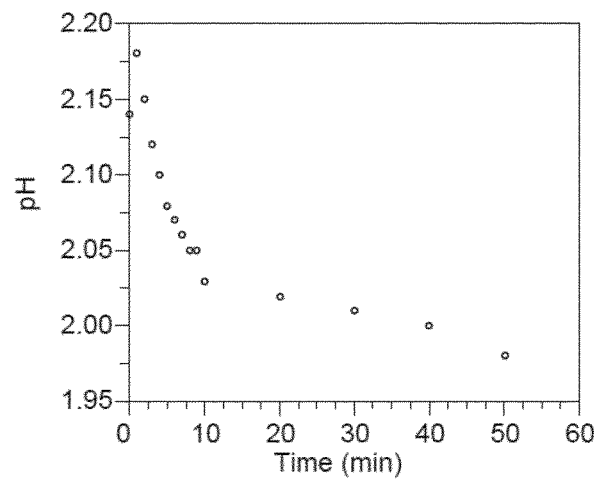
FIG. 7 shows the pH measured over time in the vicinity of NiNF dipped in a $FeCl_3$ aqueous solution. pH was measured close to NiNF (≈2 mm) in a 50 mM $FeCl_3$ aqueous solution.

Unexpectedly, no Fe could be detected in any sample (FIG. 6A). Without being bound to a theory, it is believed that the absence of galvanic replacement likely derives from the use of an aqueous solution of $FeCl_3$ as the reactant, which readily hydrolyses in water, generating HCl which is responsible for the etching of the dendrites. Local acidification of the solution in the vicinity of the surface of NiNF was confirmed by pH measurements (FIG. 7).

Example 3—Preparation of Fe-Doped Chimney-Like Dendritic Nickel Foam Via a Galvanic Exchange Reaction To achieve a galvanic replacement reaction between Ni and Fe, an organic solution of $FeCl_3$ was used to avoid hydrolysis of the Fe salt. NiNFc, as obtained via Example 2, was submerged in a 50 mM solution of $FeCl_3$/EtOH for 3 hours, generating a material containing Fe, hereafter termed Fe/NiNFc. The sample was thoroughly rinsed with water and dried in the air. The etching of the surface of NiNFc led to a mass loss of about −10 mg.

Figure 8:
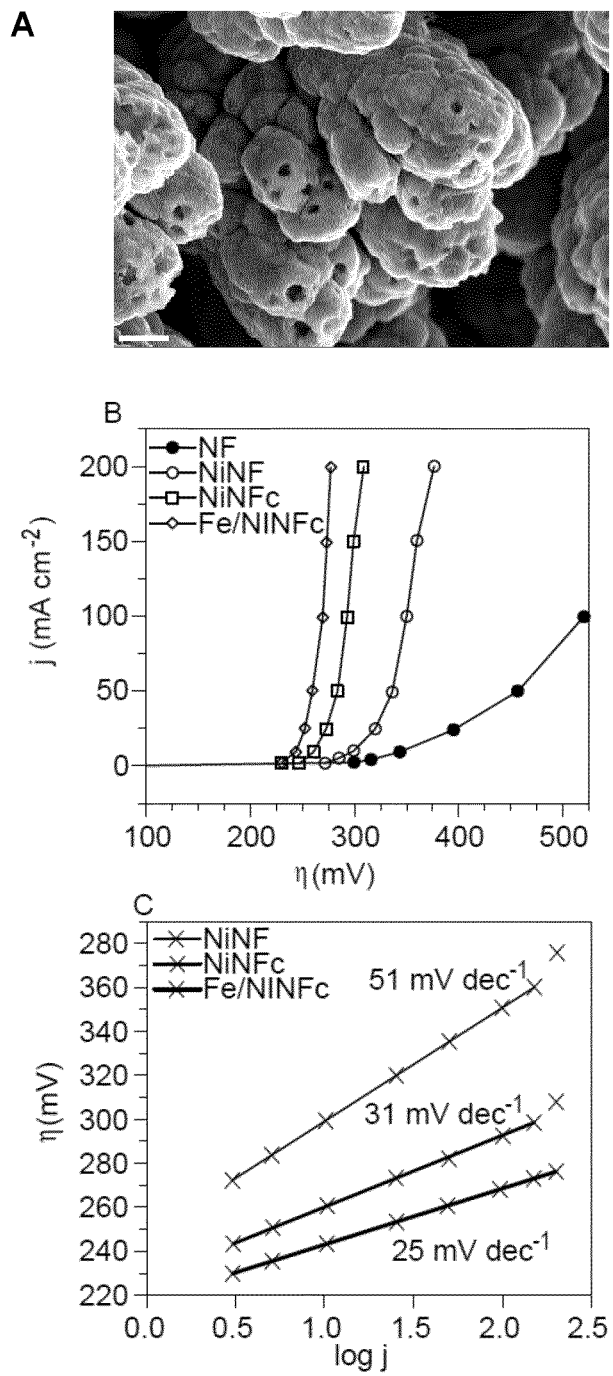
FIG. 8 shows the SEM picture and OER activity of Fe/NiNFc. A. SEM picture of Fe/NiNFc. Scale bar: 600 nm. B. Activities of NF, NiNF, NiNFc and Fe/NiNFc. Data obtained from chronopotentiometric steps recorded in a 1 M KOH electrolyte, at room temperature, under stirring, with iR-correction. C. Tafel slopes measured in 1 M KOH.
Figure 9:
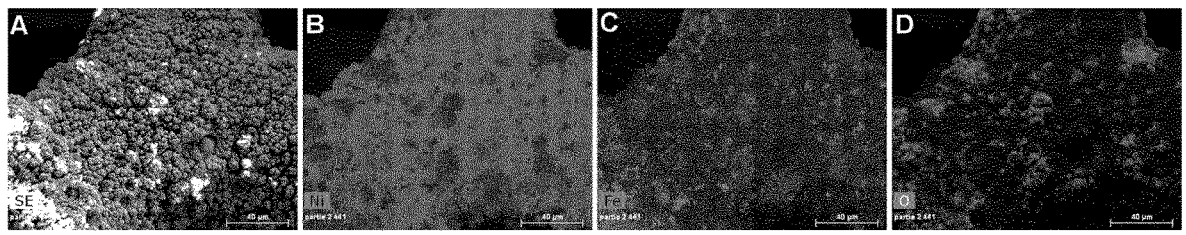
FIG. 9 is an EDX mapping of Fe/NiNFc. A. SEM picture of the sample area analysed. B. Ni content mapping. C. Fe content mapping. D. Oxygen content mapping. Ni and Fe atoms are distributed over the full surface area of the sample. Fe oxide-rich islands are observed in some places. Excitation voltage: 15 kV.

SEM images showed a surface covered with dendrites but with much narrower chimneys than in NiNFc, with a diameter of ≈200 nm (FIG. 8A). Elemental analysis showed that ≈16 at. % Fe was successfully introduced at the surface of the material (FIG. 6B). EDX elemental mapping showed that Ni and Fe were distributed over the full surface area of the sample (FIG. 9).

In 1 M KOH, a significant increase in activity was measured as compared to NiNFc. Very low overpotentials of $\eta_{10}$=244, $\eta_{100}$=269 mV and $\eta_{200}$=276 mV were measured at j=10, 100 and 200 mA $cm^{-2}$, respectively (FIG. 8B, Table 1). The current density increased extremely quickly upon sweeping to higher potentials, reflecting a remarkably low Tafel slope of 25 mV $dec^{-1}$ (FIG. 8C).

Figure 10:
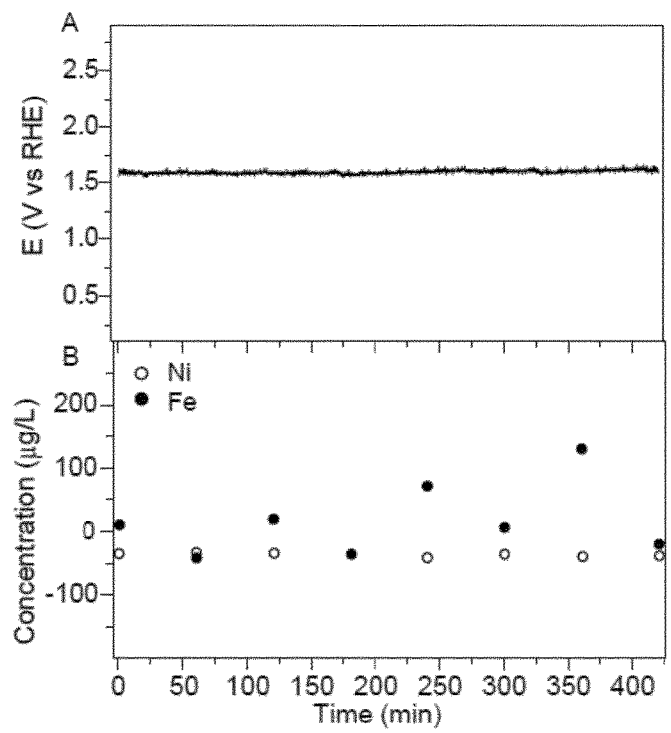
FIG. 10 depicts the stability of Fe/NiNFc in 1 M KOH at j=100 mA $cm^{-2}$ for 7 hours. The catalyst was loaded in a two-compartment cell separated by a Nafion membrane with a platinum mesh-based cathode. The anolyte and catholyte were 1 M KOH aqueous solutions (100 mL each). These solutions were recirculated in each compartment from separate containers. A current density of 100 mA $cm^{-2}$ was applied for 7 h and the potential response was measured over time. Online monitoring of the elements presents in the solution during electrolysis also allowed quantitative measurement of metal leaching from the catalysts. A. Potential response measured over time (in V vs RHE, iR-corrected). B. Fe and Ni concentrations in the electrolyte were measured by ICP-MS (in µg $L^{-1}$). Note that commercial KOH solutions commonly contain Fe (in the range 10-500 µg $L^{-1}$) so the small variations observed here do not reflect catalyst degradation.

Stability tests were performed in flow conditions at j=100 mA $cm^{-2}$ and revealed a steady potential response over 7 hours of electrolysis (FIG. 10A). Elemental analysis of the electrolyte by inductively coupled mass spectroscopy (ICP-MS) confirmed the absence of irreversible Ni and Fe dissolution over the course of the experiment, reflecting the high stability of the surface (FIG. 10B). Fe/NiNFc showed a superior density of active sites as compared to NiNFc as the double layer capacitance increased from $C_{DL}$=7.7 mF in the case of NiNFc to $C_{DL}$=8.9 mF in the case of Fe/NiNFc (FIG. 4).

The exceptional activity of Fe/NiNFc likely arises from a synergistic effect between Ni and Fe at the surface of NiNFc. Surface Fe doping is beneficial for catalysts, and the absence of Fe in the bulk is not expected to impact the OER kinetics, thereby minimising the amount of material required. Additional benefits of high ECSA and good mechanical robustness avoid detachment issues under harsh flow conditions.

Example 4—Preparation of FeNiCr-Doped Chimney-Like Dendritic Nickel Foam

NiNFc, as obtained via Example 2, was used as a starting material for the preparation of a trimetallic FeNiCr catalyst. For that purpose, an electrodeposition procedure for the formation of a hierarchically porous FeNiCr material on NiNFc has been optimized, enabling direct deposition of a robust film without the use of a binder.

For FeNiCr—NiNFc synthesis, a volume of 100 mL of the electrodeposition bath was made as follows:

First, a Cr(III)-glycine complex was prepared to stabilise the Cr precursor and prevent the formation of Cr clusters by olation (i.e., by the formation of polymeric oxides of metal ions in aqueous solutions). The Cr(III)-glycine complex was made by mixing $CrCl_3 \cdot 6H_2O$ (10.660 g, final concentration 0.4 M) and glycine (3.003 g, final concentration 0.4 M) in ~30 mL of water. This solution was heated at 80° C. under stirring for 30 minutes in an oil bath. The solution was then cooled overnight at room temperature. A 100 mL aqueous solution was made by mixing the Cr(III)-glycine complex solution to $FeCl_2 \cdot 4H_2O$ (0.596 g, 0.03 M), $NiCl_2 \cdot 6H_2O$ (0.998 g, 0.042 M), $H_3BO_3$ (0.928 g, 0.15 M), $NH_4Cl$ (2.675 g, 0.15 M) and NaCl (2.922 g, 0.5 M).

Figure 11:
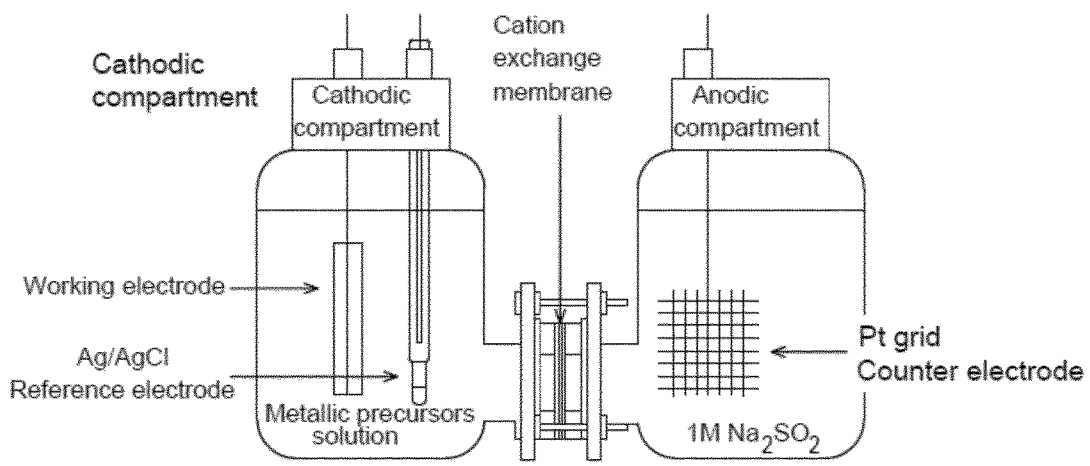
FIG. 11 illustrates the two-compartment cell setup used for electrodeposition of FeCrNi. Each compartment is 50 mL. They are separated by a cation-exchange membrane. A 4 $cm^2$ platinum mesh is used as the anode.
Figure 12:
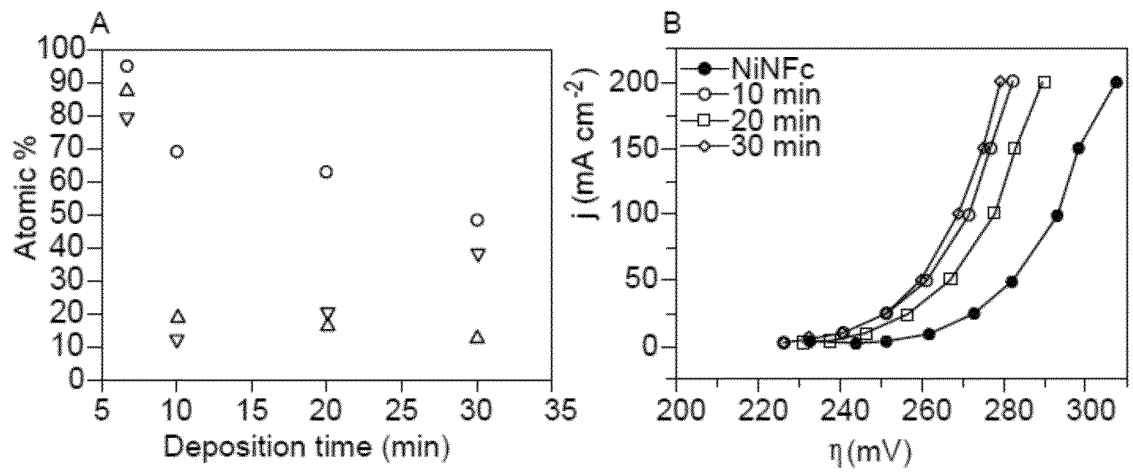
FIG. 12 shows the impact of the deposition time on the composition of FeNiCr films deposited on NiNFc and the activity of these samples after Cr removal. A. Atomic % of Fe, Ni and Cr in the FeNiCr samples before activation, according to the deposition time, as measured by EDX (excitation voltage 15 kV). B. Chronopotentiometric steps measured in 1 M KOH for NiNFc and FeNiCr catalysts with different loadings, after activation for 3 h. Data were recorded at room temperature, under stirring, with iR-correction.

Electrodeposition was performed in a custom-made two-compartment cell (FIG. 11). Each compartment had a 50 mL volume. The anodic compartment contained a saturated $Na_2SO_4$ solution. The anode was a 4 $cm^2$ platinum mesh. The cathodic compartment contained 50 mL of the deposition bath described above. The cathode was the NiNFc support. The compartments were separated by a cation-exchange membrane. A DC power generator was used to apply a constant current of −1.2 A to the cathode. Increasing deposition time (10, 20 and 30 minutes) resulted in increasing loadings of FeNiCr material (Table 2). The elemental composition of the surface layer of these compounds, as analysed by EDX, revealed decreasing Ni and Fe contents and increasing Cr content with increasing deposition time (FIG. 12A).

TABLE 2

Deposition time used for the synthesis of FeNiCr on NiNFc and resulting loadings

| Deposition time (min) | Loading* (mg $cm^{-2}$) |
|---|---|
| 10 | 18.1 |
| 20 | 32.0 |
| 30 | 43.9 |

*Loading values are in mg of FeNiCr film deposited per unit of geometric area.

The atomic-scale structure of the three samples was tuned using a cation-defect engineering strategy. Under oxidative conditions in alkaline media, Cr dissolves as $CrO_4^{2-}$ chromate species thereby introducing Cr vacancies within the metallic catalyst, which are likely to promote higher activity. An activation step was performed on the FeNiCr pre-catalysts consisting of controlled Cr removal at 100 mA $cm^{-2}$ for 3 h. A change in electrolyte solution colour from clear to yellow was observed reflecting the oxidation of Cr(III) to Cr(VI) species. The three activated catalysts were tested for OER activity in a fresh 1 M KOH solution. The sample with the highest loading, named *FeNiCr—NiNFc (obtained after 30 minutes of deposition and oxidative Cr removal) showed the best performance and was used for the remainder of the study (FIG. 12B).

As indicated before the sample FeNiCr—NiNFc corresponds to 30 minutes of deposition time. After deposition, the sample was thoroughly rinsed with water and dried in air. The deposited mass was ≈45 mg. Activation was performed in a two-compartment cell, in a 1 M KOH ultrapure solution). A current density of j=100 mA $cm^{-2}$ was applied to the working electrode for 3 hours. The leached mass was ≈6 mg.

Figure 13:
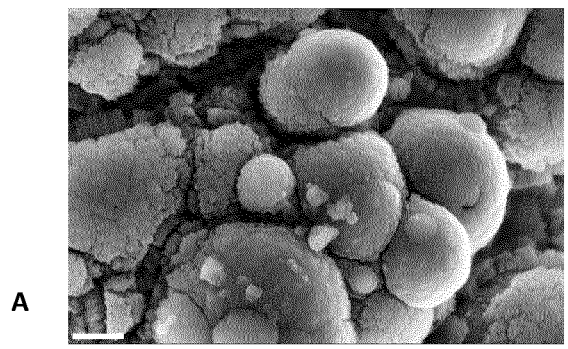
FIG. 13 shows the SEM picture and OER activity of *FeNiCr—NiNFc. A. SEM picture of *FeNiCr—NiNFc. Scale bar: 600 nm. B. Activities of NF, NiNF, NiNFc and *FeNiCr—NiNFc. Data obtained from chronopotentiometric steps measured in 1 M KOH, at room temperature, under stirring, with iR-correction. C. Tafel slopes measured in 1 M KOH.
Figure 13:
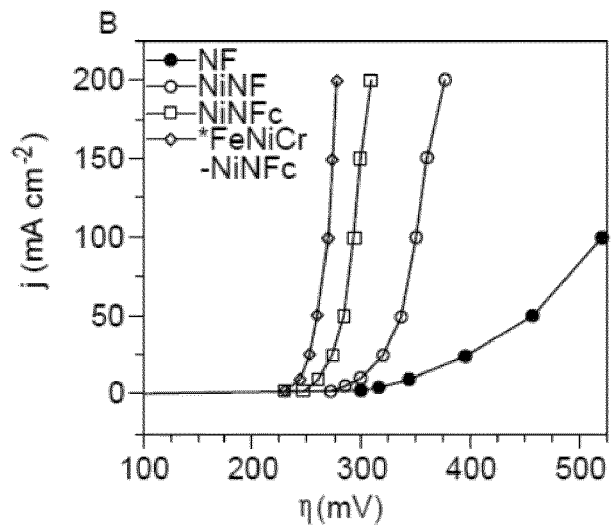
Figure 13:
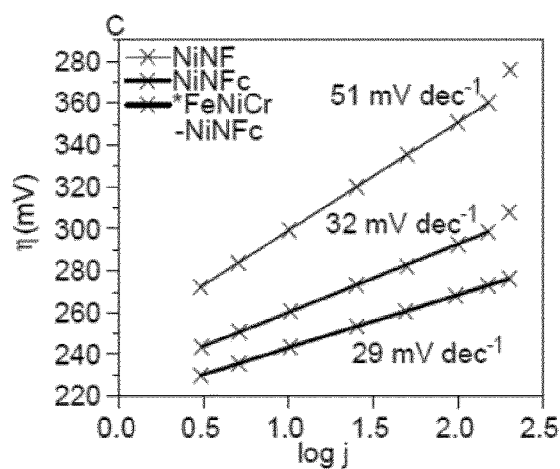

A high double-layer capacitance was measured for the FeNiCr—NiNFc pre-catalyst ($C_{DL}$=9.8 mF). This value further increased upon Cr removal to reach $C_{DL}$=12.4 mF for the activated sample (FIG. 4). *FeNiCr—NiNFc displayed very low overpotentials of 241, 269 and 279 mV at j=10, 100 and 200 mA cm$^{-2}$, respectively, with a low Tafel slope of 29 mV dec$^{-1}$, much lower than the values measured for NiNFc (FIGS. 13B and 13C).

The activation step of FeNiCr—NiNFc was studied in a custom-made 2×50 mL two-compartment cell. The two compartments were separated by a bipolar membrane. They were initially filled with 50 mL of a 1 M aqueous solution of ultrapure KOH. The counter electrode was a 4 cm$^2$ platinum mesh. The working electrode was the as-deposited FeNiCr—NiNFc. An Ag/AgCl/KCl$_{sat}$ was used as the reference electrode. A current density of j=100 mA cm$^{-2}$ was applied for 7 hours. The gas produced in the anode compartment was analysed by GC every 20 minutes using an SRI 8610C gas chromatograph equipped with a packed Molecular Sieve 5 Å column for permanent separation. Argon (Linde 5.0) was used as the carrier gas, the flow rate was regulated using a mass flow controller (Bronkhorst). A thermal conductivity detector (TCD) was used to quantify O$_2$. The Faradaic efficiency (FE$_{O_2}$) was calculated by dividing the measured amount of oxygen by the theoretical amount of O$_2$ expected (Equation 8):

$$FE_{O_2} = \frac{n_{O_2,measured}}{n_{O_2,expected}} = \frac{n_{O_2,measured} \cdot 4F}{Q}$$

wherein n$_{O_2,measured}$ and n$_{O_2,expected}$ are the measured and expected amounts of O$_2$, Q the charge passed and F the Faraday constant. An aliquot of anolyte was collected every hour. The aliquots collected were analysed via inductively coupled plasma-mass spectrometry (ICP-MS).

Figure 14:
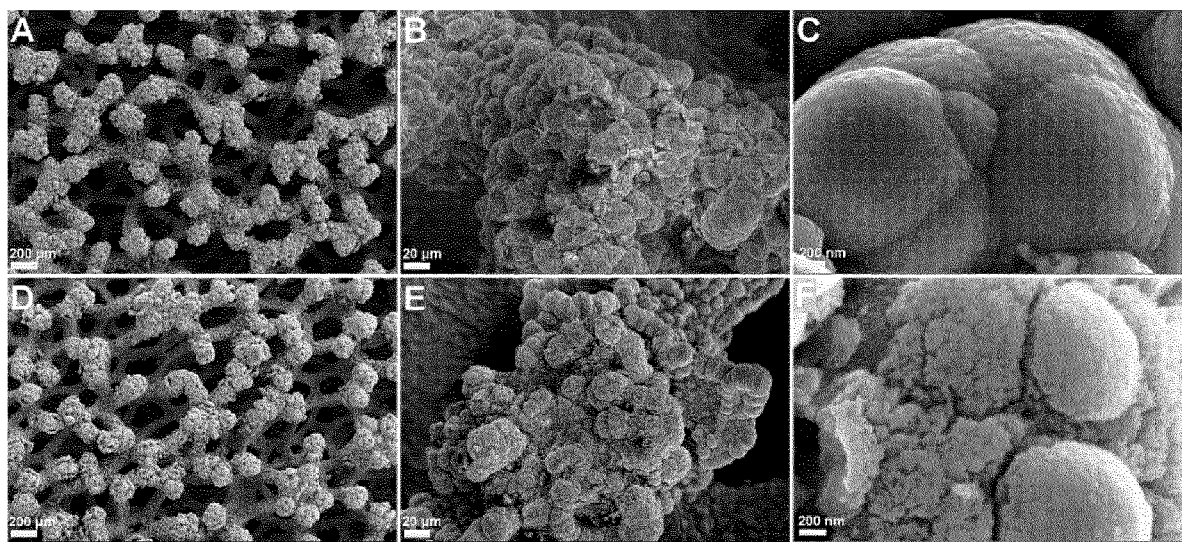
FIG. 14 shows SEM images of FeCrNi films electrodeposited on NiNFc. A, B, C. Before activation. D, E, F. After activation.
Figure 15:
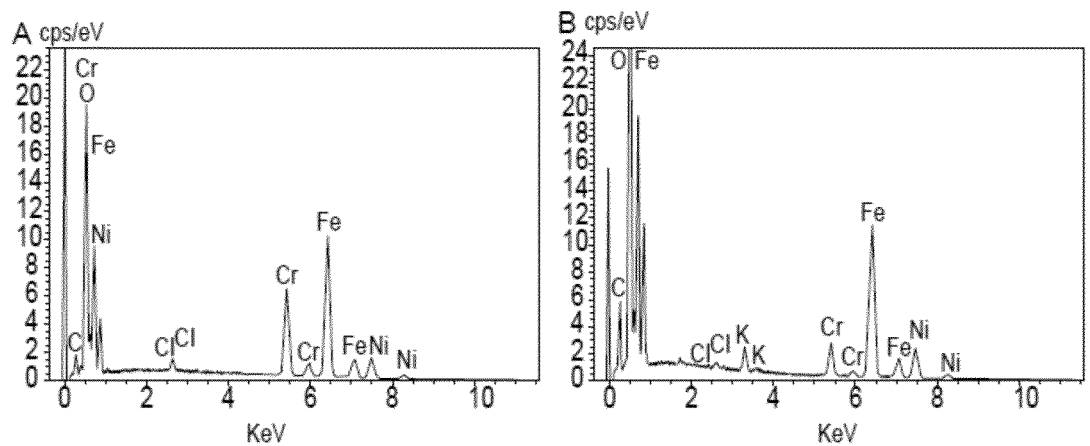
FIG. 15 illustrates the atomic composition of the *FeNiCr—NiNFc catalyst before and after Cr removal for 3 hours under oxidative conditions. Data were obtained using X-ray electron diffraction spectroscopy (EDX). A. Before activation. B. After activation. Excitation voltage: 15 kV.

The surface structure of the catalyst observed using SEM before (FIGS. 14A to 14C) and after (FIGS. 14D to 14F) Cr leaching revealed thick films homogeneously covering the NiNFc with dendrites in the range 1-10 μm. Smaller pores (in the 100 nm range) appeared after leaching. The atomic composition of the material was different before and after leaching, reflecting partial Cr removal (FIG. 15 table 3).

TABLE 3

Atomic composition of the *FeNiCr—NiNFc catalyst before and after Cr removal for 3 hours under oxidative conditions.

| Element | Before Cr leaching (at. %) | After Cr leaching (at. %) |
|---|---|---|
| Fe | 48.8 | 66.2 |
| Ni | 12.8 | 22.5 |
| Cr | 38.4 | 11.3 |

The Fe:Ni:Cr ratio was initially 1:0.26:0.78, and became 1:0.34:0.17, due to major leaching of Cr and minor leaching of Fe. EDX elemental mapping showed a clear decrease in Cr content. Interestingly, a significant portion of Cr (~ 11 at. %) remained in the material.

Figure 16:
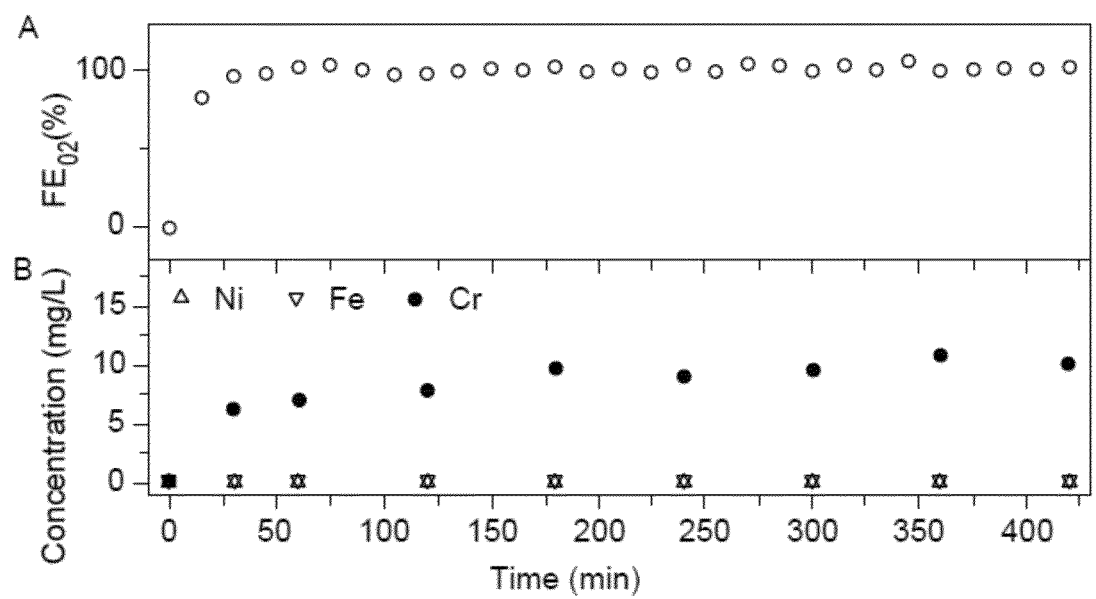
FIG. 16 represents an overtime study of the catalyst activation by Cr removal. A. Faradaic Efficiency for $O_2$ production during the activation step. The as-deposited FeNiCr-NiNFc material was kept in a 1 M KOH solution under a current density of 100 mA $cm^{-2}$ and the gas evolved was analysed by GC. B. Ni, Fe and Cr concentration in the anode compartment were measured over time by ICP-MS. The anode compartment was initially filled with 50 mL of ultrapure 1 M KOH solution.

The leaching process and Cr stability over 7 h electrolysis at 100 mA cm$^{-2}$ was verified through a time-dependent study where the faradaic efficiency for O$_2$ production (FE$_{O_2}$) was analysed using online gas chromatography alongside measurements of the ionic concentrations of Fe, Ni, and Cr using inductively coupled plasma-mass spectroscopy (ICP-MS) (FIG. 16). FE$_{O_2}$ increased quickly during the first hour of activation and stabilised around 100%, which we attributed to the Cr$^{III}$→Cr$^{VI}$ oxidation process. The Ni concentration in the solution remained close to zero over the 7 h of activation but the Fe concentration slowly increased to 0.17 mg L$^{-1}$. The concentration of Cr in solution increased very quickly up to 10 mg L$^{-1}$ and stabilised after 3 h showing that the *FeNiCr—NiNFc catalyst reaches a Cr composition of 11 at. % after 3 hours and that this composition remained stable upon prolonged treatment.

Figure 17:
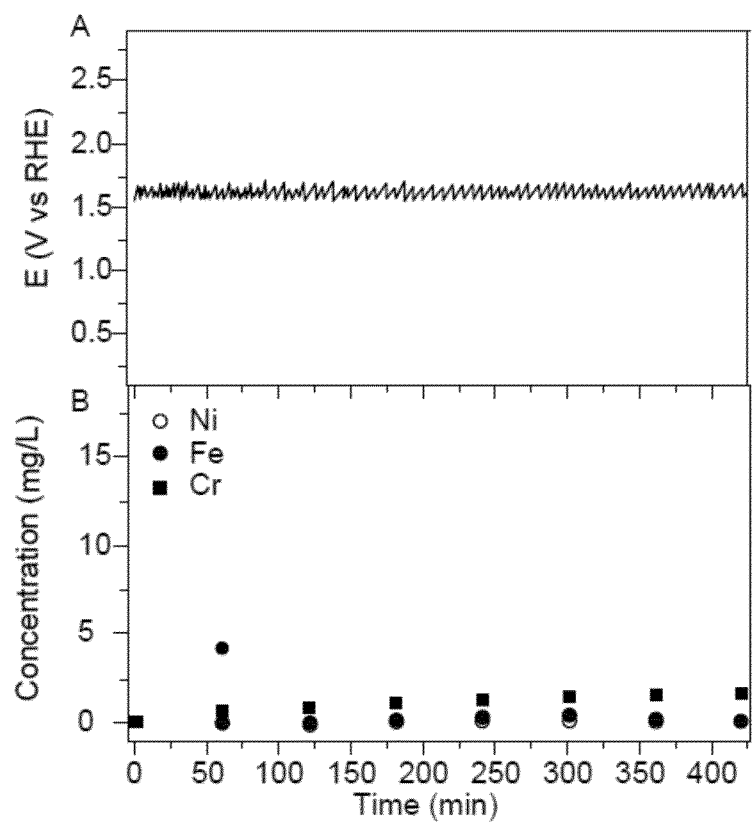
FIG. 17 illustrates the stability of *FeNiCr—NiNFc in 1 M KOH at j=100 mA $cm^{-2}$ for 7 hours. The catalyst was loaded in a two-compartment cell separated by a Nafion membrane with a platinum mesh-based cathode. The anolyte and catholyte were 1 M KOH aqueous solutions (100 mL each). These solutions were recirculated in each compartment from separate containers. A current density of 100 mA $cm^{-2}$ was applied for 7 h and the potential response was measured over time. Online monitoring of the elements presents in solution during electrolysis also allowed quantitative measurement of metal leaching from the catalysts. A. Potential response measured over time (in V vs RHE, iR-corrected). B. Fe, Ni and Cr concentrations in the electrolyte were measured by ICP-MS (in µg $L^{-1}$).

The stability of the activated *FeNiCr—NiNFc sample was evaluated in flow conditions at a fixed current density of 100 mA cm$^{-2}$ and showed a constant potential response over the course of 7 hours of electrolysis (FIG. 17A). Surface stability measurements after Cr leaching revealed no Fe and Ni dissolution during electrolysis at 100 mA cm$^{-2}$. Only small amounts of Cr were dissolved at a very slow rate, reflecting the relatively high stability of the *FeNiCr—NiNFc catalyst (FIG. 17B).

The high activity of this catalyst is attributed to the positive effects of Cr-doping. The presence of ~ 11 at. % of Cr in the material is expected to lead to an increase in its OER activity arising from the electronic modulation effects of the high-valence dopant.

Additionally, the formation of vacancies, dangling bonds and under-coordinated sites upon removal of Cr, increases the number of electrochemically exposed active sites, as suggested from C$_{DL}$ measurements (FIG. 4). The composition of the resulting material is 66.2 at. % Fe, 22.5 at. % Ni and 11.3 at. % Cr.

The present disclosure shows that an extremely straightforward procedure is capable of forming a highly active NiFe OER catalyst, placing it amongst the most active OER catalysts reported so far (Table 4).

TABLE 4

Tafel slopes of the catalysts and catalyst assemblies described according to the nature of their cations.

| Catalyst | Tafel slope | Ref |
|---|---|---|
| Ni- and Fe-based oxides | | |
| NiFe LDH on NF | 50 mV dec$^{-1}$ | 1 |
| NiFe hierarchical | 53 mV dec$^{-1}$ | 2 |
| Amorphous NiFe LDH | 28 mV dec$^{-1}$ | 3 |
| FeNi$_3$/doped C-based | 40 mV dec$^{-1}$ | 4 |
| NiFeO$_x$ nanosheets | 32 mV dec$^{-1}$ | 5 |
| NiFe—OOH | 36 mV dec$^{-1}$ | 6 |
| NiFeO$_x$ on Fe support | 48 mV dec$^{-1}$ | 7 |
| NiFe nanotubes/ZnO | 92 mV dec$^{-1}$ | 8 |
| NiFe—OOH oxygen | 40 mV dec$^{-1}$ | 9 |
| Fe/NiNFc | 25 mV dec$^{-1}$ | This work |
| High valence dopants | | |
| LiCoFeNiO$_2$ | 35 mV dec$^{-1}$ | 10 |
| dealloyed NiFe—Al | 36 mV dec$^{-1}$ | 11 |
| *FeNiCr—NiNFc | 29 mV dec$^{-1}$ | This work |

All measures were performed in a 1M KOH electrolyte unless otherwise stated
$^a$Data collected in 0.1M KOH,
$^b$Data collected in 0.1M potassium phosphate (KPi) buffer (neutral pH).

REFERENCES

Lu et al., *Chem. Commun.*, 2014, 50, 6479-6482.
1) Li et al., *Chem. Sci.*, 2015, 6, 6624-6631.
2) Lu et al., *Nat. Commun.*, 2015, 6, 6616.
3) Liu et al., *ChemSusChem*, 2018, 11, 2703-2709.
4) Long et al., *J. Mater. Chem. A*, 2016, 4, 14939-14943.
5) Song et al., *ACS Cent. Sci.*, 2019, 5, 558-568.
6) Liu et al., *Nat. Commun.*, 2018, 9, 2609.
7) Yu et al., *Appl. Catal. B Environ.*, 2020, 261, 118193.
8) Asnavandi et al., *ACS Energy Lett.*, 2018, 3, 1515-1520.
9) Lu et al., *Nat. Commun.*, 2014, 5, 1-7.

10) Cui et al., *Int. J. Hydrogen Energy*, 2018, 43, 15234-15244.

Subsequently, it was found that Fe/NiNFc is a promising material for the development of large-scale OER catalysis devices. As industrial electrolysers will operate at several hundreds of milliamperes per square centimetre, a low Tafel slope is key to highly efficient devices development. Additionally, this catalyst was synthesised via a straightforward and easily scalable 3-step procedure, which do not involve any hazardous chemicals.

The invention claimed is:

1. A method to produce an oxygen evolution reaction electrode catalyst assembly comprising a dendritic nickel foam; the method is characterized in that it comprises the steps
   (a) providing a dendritic nickel foam material being a nickel foam that shows a dendrite morphology evidenced by scanning electron microscopy with nickel dendrites forming a nickel dendrites layer;
   (b) etching the dendritic nickel foam material by placing it in a etch solution having a pH ranging from 1.0 to 4.0 and being an aqueous acidic solution or an aqueous solution of metal chloride, and recovering an etched dendritic nickel foam with nickel dendrites showing a chimney-like structure that is porous with three levels of porosity and shows pores of a first type having an average pore size diameter ranging from 20.0 µm to 50.0 µm as determined by scanning electron microscopy, pores of a second type having an average pore size diameter ranging from 1.0 to 5.0 µm as determined by scanning electron microscopy, and pores of a third type having an average pore size diameter ranging from 0.1 µm to 1.0 µm as determined by scanning electron microscopy; and
   (c) of addition of one or more transition metals, wherein step (c) comprises a step (c1) of galvanic exchange reaction or a step (c2) of electrodeposition or both steps c1) of galvanic exchange reaction and step (c2) of electrodeposition.

2. The method according to claim 1 is characterised in that the etching step (b) is performed in a etch solution for a time ranging from 1 to 60 minutes.

3. The method according to claim 1 is characterised in that the etching step (b) is performed in a etch solution having a pH ranging from 1.8 to 2.5 for a time ranging from 1 to 15 minutes.

4. The method according to claim 1 is characterised in that step (a) comprises providing nickel foam followed by a step of electrodeposition of nickel on said nickel foam to obtain a dendritic nickel foam.

5. The method according to claim 1 is characterised in that step (a) comprises providing a dendritic nickel foam selected to have a double-layer capacitance of at least 2.0 mF as determined by cyclic voltammetry in the range between +0.95 V and +1.05 V versus RHE.

6. The method according to claim 1 is characterised in that step (c) of addition of one or more transition metals comprises the step (c1) of doping the etched dendritic nickel foam with one or more transition metals via a galvanic exchange reaction and recovering a Me-doped dendritic nickel foam with Me-doped nickel dendrites showing a chimney-like structure.

7. The method according to claim 6 is characterised in that in step (c1) using a galvanic exchange reaction, the etched dendritic nickel foam is doped with one or more transition metals selected from Fe, Cr, Co, Cu, V, Mn, Mo, Pt, W and any mixture thereof.

8. The method according to claim 1 is characterized in that the method further comprises a step (c2) of electrodeposition on the etched dendritic nickel foam of a metallic catalyst comprising one or more transition metals selected from Fe, Cr, Co, Cu, V, Mn, Mo, Ni, Pt, W and any mixture thereof.

9. The method according to claim 8 is characterized in that the metallic catalyst is a multi-metallic catalyst and comprises Ni and Fe and at least one additional metal selected from Cr, Co, Cu, V, Mn, Mo, Pt, W and any mixture thereof.

10. The method according to claim 8 is characterized in that the metallic catalyst is a multi-metallic catalyst and in that step (c2) is followed by a step (d) of leaching to decrease the content of at least one transition metal of the multi-metallic catalyst.

11. The method according to claim 1 is characterized in that the etched dendritic nickel foam with nickel dendrites showing a chimney-like structure recovered in step (b) is porous and shows pores of a fourth type having an average pore size diameter ranging from 100 µm to 1000 µm as determined by scanning electron microscopy; with preference ranging from 200 to 800 µm.

12. An oxygen evolution reaction electrode catalyst assembly is characterized in that it comprises an etched dendritic nickel foam with nickel dendrites showing a chimney-like structure forming an etched nickel dendrites layer being porous with three levels of porosity and showing pores of a first type having an average pore size diameter ranging from 20.0 µm to 50.0 µm as determined by scanning electron microscopy, pores of a second type having an average pore size diameter ranging from 1.0 to 5.0 µm as determined by scanning electron microscopy, and pores of a third type having an average pore size diameter ranging from 0.1 µm to 1.0 µm as determined by scanning electron microscopy;
   and in that the etched dendritic nickel foam is doped with one or more transition metals selected from Fe, Cr, Co, Cu, V, Mn, Mo, Pt, W and any mixture thereof.

13. The oxygen evolution reaction electrode catalyst assembly according to claim 12 characterized in that the one or more doping transition metals are present at a content ranging from 5 to 30 at. % as analysed by EDX.

14. An oxygen evolution reaction electrode catalyst assembly comprising a metallic catalyst and a support, with the metallic catalyst being deposited on the support, the electrode catalyst assembly is characterized in that the support is an etched dendritic nickel foam with nickel dendrites showing a chimney-like structure forming an etched nickel dendrites layer being porous with three levels of porosity and show pores of a first type having an average pore size diameter ranging from 20.0 µm to 50.0 µm as determined by scanning electron microscopy, pores of a second type having an average pore size diameter ranging from 1.0 to 5.0 µm as determined by scanning electron microscopy, and pores of a third type having an average pore size diameter ranging from 0.1 µm to 1.0 µm as determined by scanning electron microscopy; and in that the metallic catalyst comprises one or more transition metals selected from Fe, Cr, Co, Cu, V, Mn, Mo, Ni, Pt, W and any mixture thereof.

15. The oxygen evolution reaction electrode catalyst assembly according to claim 14 is characterized in that the metallic catalyst is a multi-metallic catalyst and is or comprises Fe and Ni.

16. The oxygen evolution reaction electrode catalyst assembly according to claim 14 is characterized in that the metallic catalyst is a multi-metallic catalyst and is or comprises Fe, Ni and one or more transition metals selected from Cr, Co, Cu, V, Mn, Mo, Pt, W and any mixture thereof.

17. The oxygen evolution reaction electrode catalyst assembly of claim 14 is characterized in that it shows pores of a fourth type having an average pore size diameter ranging from 100 μm to 1000 μm as determined by scanning electron microscopy.

18. The oxygen evolution reaction electrode catalyst assembly according to claim 14 is characterized in that the pores of a third type have an average pore size diameter ranging from 0.1 μm to 0.6 μm as determined by scanning electron microscopy.

19. The oxygen evolution reaction electrode catalyst assembly according to claim 14 is characterized in that it shows overpotential values below 310 mV at a current density of 100 mA cm$^{-2}$ at pH 14 and in 1.0 M electrolyte solution.

20. The oxygen evolution reaction electrode catalyst assembly according to claim 14 is characterized in that shows a Tafel slope of at most 30 mV decade as determined by chronopotentiometry measurements conducted in an aqueous 1 M solution of KOH.

\* \* \* \* \*

UNITED STATES PATENT AND TRADEMARK OFFICE
CERTIFICATE OF CORRECTION

PATENT NO. : 12,258,667 B2
APPLICATION NO. : 18/701701
DATED : March 25, 2025
INVENTOR(S) : Peugeot et al.

It is certified that error appears in the above-identified patent and that said Letters Patent is hereby corrected as shown below:

In the Claims

Claim 20, Column 27, Line 18:
"shows a Tafel slope of at most 30 mV decade as determined"
Should read:
"shows a Tafel slope of at most 30 mV decade-1 as determined"

Signed and Sealed this
Sixth Day of May, 2025

Coke Morgan Stewart
*Acting Director of the United States Patent and Trademark Office*